(12) United States Patent
Yanagita et al.

(10) Patent No.: US 7,799,452 B2
(45) Date of Patent: Sep. 21, 2010

(54) SOLID POLYMER ELECTROLYTE MEMBRANE AND PRODUCTION METHOD OF THE SAME

(75) Inventors: Yoshinori Yanagita, Yokohama (JP); Kohei Kita, Yokohama (JP); Naoki Sakamoto, Fuji (JP); Takehiro Koga, Fuji (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 792 days.

(21) Appl. No.: 11/221,971

(22) Filed: Sep. 9, 2005

(65) Prior Publication Data
US 2006/0199062 A1    Sep. 7, 2006

(30) Foreign Application Priority Data

| Sep. 9, 2004 | (JP) | ............................... 2004-262649 |
| Dec. 24, 2004 | (JP) | ............................... 2004-373829 |
| Jan. 6, 2005 | (JP) | ............................... 2005-001509 |

(51) Int. Cl.
*H01M 8/10* (2006.01)

(52) U.S. Cl. .................. 429/33; 204/263; 204/296; 429/309; 521/27

(58) Field of Classification Search ............ 429/33, 429/309; 204/263, 296; 521/27
See application file for complete search history.

(56) References Cited

U.S. PATENT DOCUMENTS

| 6,248,469 B1 * | 6/2001 | Formato et al. ............... 429/41 |
| 6,264,857 B1 * | 7/2001 | Kreuer et al. ............... 252/500 |
| 6,723,757 B1 | 4/2004 | Kerres et al. |
| 7,235,320 B2 * | 6/2007 | Calundann et al. ............. 429/30 |
| 2004/0122256 A1 | 6/2004 | Ikeda et al. |
| 2004/0262227 A1 * | 12/2004 | Kiefer et al. ................ 210/650 |
| 2005/0142433 A1 * | 6/2005 | Ueda et al. .................... 429/44 |

FOREIGN PATENT DOCUMENTS

| EP | 1788654 A1 * | 5/2007 |
| JP | 2001-514431 | 9/2001 |
| JP | 2003132908 | 5/2003 |
| JP | 2003203648 | 7/2003 |
| JP | 2004146367 | 5/2004 |
| KR | 2003-0032321 | 4/2003 |
| WO | 03/016384 A2 | 2/2003 |

OTHER PUBLICATIONS

Japanese Search Report issued on Dec. 13, 2005.
European Search Report dated Feb. 2, 2010 and issued in corresponding European Patent Application 05778564.4.

* cited by examiner

*Primary Examiner*—Peter D. Mulcahy
*Assistant Examiner*—Henry Hu
(74) *Attorney, Agent, or Firm*—Staas & Halsey LLP

(57) ABSTRACT

An object is to provide a solid polymer electrolyte membrane for solid polymer electrolyte fuel cell, which has high durability, as well as a membrane electrode assembly and a solid polymer electrolyte fuel cell, each containing the same. The solid polymer electrolyte membrane is produced using polymer electrolyte-containing solution preparation step of dissolving a perfluorocarbonsulfonic acid resin (component A) having an ion-exchange capacity of 0.5 to 3.0 meq/g, a polyazole-based compound (component B) and an alkali metal hydroxide in a protic solvent to prepare a polymer electrolyte-containing solution in which a weight ratio of the component A to component B, (A/B), is from 2.3 to 199 and a total weight of the component A and the component B is from 0.5 to 30% by weight. In a membrane formation step, a membrane is formed from the polymer electrolyte-containing solution.

20 Claims, No Drawings

SOLID POLYMER ELECTROLYTE MEMBRANE AND PRODUCTION METHOD OF THE SAME

TECHNICAL FIELD

The present invention relates to a fluorinated solid polymer electrolyte membrane and, more particularly, to a fluorinated solid polymer electrolyte membrane suited for a solid polymer electrolyte fuel cell and to a method for producing the same. Also the present invention relates to an electrolyte membrane and an electrolyte material of a solid polymer electrolyte fuel cell, as well as a fluorinated polymer electrolyte-containing solution suited for the production of a diaphragm for electrolysis and dialysis, and a method for preparing the same.

BACKGROUND ART

A fuel cell is a kind of power generator capable of producing electric energy by electrochemically oxidizing fuels such as hydrogen and methanol, and a fuel cell has recently been noted as a clean energy supply source.

A fuel cell is classified into a phosphoric acid type, a molten carbonate type, a solid oxide type and a solid polymer electrolyte type according to the kind of electrolyte used. Among these fuel cells, a solid polymer electrolyte fuel cell is expected to be widely employed as a power supply for electric cars because of its low operation temperature, of 100° C. or lower, and its high energy density.

The solid polymer electrolyte fuel cell is basically composed of a solid polymer electrolyte membrane and a pair of gas diffusion electrodes connected to both surfaces of the solid polymer electrolyte membrane, and generates electricity when hydrogen is supplied to anodic electrode, oxygen is supplied to cathodic electrode and an external load circuit is connected between the electrodes. More specifically, protons and electrons are produced at the anodic electrode and protons transfer in the solid polymer electrolyte membrane to reach the cathodic side electrode, where the protons react with oxygen to produce water. On the other hand, electrons flowed out from the anodic side electrode through a conductor reach the cathodic side electrode through the conductor after losing electric energy in the external load circuit, and electrons contribute to the progression of the water production reaction.

As characteristics required to the solid polymer electrolyte membrane, high ionic conductivity is exemplified, first. It is considered that protons are stabilized by hydration of water molecules when protons transfer through the solid polymer electrolyte membrane. Therefore, strong hygroscopic properties, ionic conductivity and water dispersibility are important characteristics required of the solid polymer electrolyte membrane. As the solid polymer electrolyte membrane functions as a barrier which prevents the direct reaction of hydrogen with oxygen, low gas permeability is also required.

Examples of other required characteristics include the chemical stability required to endure a strong oxidative atmosphere during the operation of the fuel cell, and the mechanical strength required to endure a further reduction in thickness.

As the material of the solid polymer electrolyte membrane used in the solid polymer electrolyte fuel cell, a fluorinated ion-exchange resin has widely been employed because high chemical stability is required. Among these resins, for example, there has widely been employed "Nafion®" manufactured by DuPont, which has a main chain made of a perfluorocarbon and also has a sulfonic acid group at the end of a side chain. The fluorinated ion-exchange resin has generally well-balanced characteristics for the solid polymer electrolyte membrane. As the cell is put into practical use, higher durability has been required.

Methods of adding a polymer comprising a nitrogen-containing heterocyclic compound as one of polyazole-based compounds to a perfluorocarbon-based ion-exchange resin have been studied (see, for example, Korean Unexamined Patent Publication No. 2003-32321, International Publication WO 99/544707, and International Publication WO 98/07164). Furthermore, in Japanese Unexamined Patent Publication No. 2001-514431, there is a description which suggests that a structure interpenetrating polymer network is formed by dissolving a perfluorocarbon-based resin and a polymer serving as a porous base material in a common solvent and casting the resulting solution to form a membrane. As examples of the porous base material, polybenzoxazole or polybenzimidazole, as kinds of polyazoles are known.

These nitrogen-containing heterocyclic compounds can improve the mechanical and the thermal stability and it is expected that the durability during the operation of the cell will be improved. However, according to these studies, an aprotic solvent is used as a solvent to dissolve a perfluorocarbon-based ion-exchange resin or a nitrogen-containing heterocyclic compound. International Publication WO 98/07164 describes an aprotic solvent and water as an example of the solvent which is optionally used. However, there is not described that the solvent is used together with an alkali metal hydroxide. An electrolyte membrane for solid polymer electrolyte fuel cell made by using these aprotic solvents is generally inferior in dispersibility of a nitrogen-containing heterocyclic compound and the amount of the nitrogen-containing heterocyclic compound which effectively functions decreases, and thus high durability cannot be attained. When an acidic polymer solution is mixed with a basic polymer solution, a slightly soluble large-sized precipitate is quickly formed, thus making it difficult to obtain a uniform and clear solution. Therefore, a uniform membrane cannot be obtained.

Although the nitrogen-containing heterocyclic compound is dissolved in a bipolar aprotic solvent such as dimethylacetamide, high temperature is required so as to dissolve the compound, thus requiring a dissolution operation in a pressure-resistant vessel.

When a solid polymer electrolyte membrane is made by using the above aprotic solvent, the aprotic solvent is decomposed in case of preparing a polymer electrolyte-containing solution for membrane formation or forming a membrane from the polymer electrolyte-containing solution, and the resulting decomposition product is bonded with an ion-exchange group and, thus, the generating capacity of a fuel cell is lowered. Also the decomposition product remains in an exchange membrane and a fuel cell comprising a solid polymer electrolyte membrane containing the residual decomposition product assembled therein requires a long time until electric power is stably produced after starting. During the starting, the decomposition product is bonded with a catalyst in the electrode and gives a poisoning effect on a catalyst thereby to cause a problem such as low generating capacity of the fuel cell, and thus high durability cannot be obtained.

Dimethyl-sulfoxide (DMSO), dimethylacetamide (DMAC) and dimethyl-formamide (DMF), which have conventionally used as the aprotic solvent, per se, are harmful to the human body and is not considered to be friendly to the global environment. Furthermore, since these aprotic solvents have high boiling points, it takes a long time for purification and a high temperature is required for removal of the solvent, thus causing a problem such as poor productivity of the solid polymer electrolyte membrane. Also, these aprotic solvents are expensive.

SUMMARY OF THE INVENTION

An object of the present invention is to provide a polymer electrolyte membrane in which a polyazole-based compound is uniformly mixed with a perfluorocarbonsulfonic acid resin. Thus, the present invention provides a polymer electrolyte membrane for a solid polymer electrolyte fuel cell, which has high durability, as well as a membrane electrode assembly and a solid polymer electrolyte fuel cell, each containing the same.

The present inventors have intensively studied so as to achieve the object described above and found that a polymer electrolyte-containing solution can be obtained by dissolving a polyazole-based compound and a perfluorocarbonsulfonic acid resin in a protic solvent, together with an alkali metal hydroxide. It has also been unexpectedly found that, when the resulting polymer electrolyte-containing solution is subjected to a cation-exchange resin treatment and/or a dialysis treatment using a cation-exchange membrane, an alkali metal can be optionally removed and thus a polymer electrolyte-containing solution composed only of a polyazole-based compound, a perfluorocarbonsulfonic acid resin and a protic solvent can be obtained. It has also been found that a membrane formed by using the above polymer electrolyte-containing solution shows high durability to hydrogen leakage, formation of pinholes and degradation due to oxidation in a cell durability test under high temperature and low humidity conditions of a fuel cell, and is also excellent in stability of a generated voltage at the initial stage of the operation of the cell. Thus, the present invention has been completed.

The present invention provides the following inventions:

(1) A method for producing a solid polymer electrolyte membrane, which comprises a polymer electrolyte-containing solution preparation step of dissolving a perfluorocarbonsulfonic acid resin (component A) having an ion-exchange capacity of 0.5 to 3.0 meq/g, a polyazole-based compound (component B) and an alkali metal hydroxide in a protic solvent to prepare a polymer electrolyte-containing solution in which a weight ratio of the component A to component B, (A/B), is from 2.3 to 199 and a total weight of the component A and the component B is from 0.5 to 30% by weight; and a membrane formation step of forming a membrane from the above polymer electrolyte-containing solution.

(2) A method for producing a solid polymer electrolyte membrane according to 1 above, wherein the electrolyte-containing solution preparation step comprises mixing a solution obtained by dissolving a perfluorocarbonsulfonic acid resin having an ion-exchange capacity of 0.5 to 3.0 meq/g in a protic solvent with a solution obtained by dissolving the polyazole-based compound and the alkali metal hydroxide in the protic solvent.

(3) A method for producing a solid polymer electrolyte membrane according to 2 above, wherein the polymer electrolyte-containing solution preparation step comprises adding the solution obtained by dissolving the perfluorocarbonsulfonic acid resin having an ion-exchange capacity of 0.5 to 3.0 meq/g in the protic solvent to the solution obtained by dissolving the polyazole-based compound and the alkali metal hydroxide in the protic solvent.

(4) A method for producing a solid polymer electrolyte membrane according to any one of 1 to 3 above, wherein the amount of the alkali metal hydroxide is 1 to 100 equivalents per equivalent of nitrogen atoms in the polyazole-based compound.

(5) A method for producing a solid polymer electrolyte membrane according to any one of 1 to 4 above, wherein, in the polymer electrolyte-containing solution preparation step, the perfluorocarbonsulfonic acid resin having an ion-exchange capacity of 0.5 to 3.0 meq/g, the polyazole-based compound and the alkali metal hydroxide are dissolved in the protic solvent and the resulting solution is subjected to a cation-exchange resin treatment and/or a dialysis treatment using a cation-exchange membrane.

(6) A method for producing a solid polymer electrolyte membrane according to any one of 1 to 5 above, wherein, in the membrane formation step, a membrane is formed, followed by washing with an acid, washing with water and, if necessary, a heat treatment.

(7) A method for producing a solid polymer electrolyte membrane according to any one of 1 to 6 above, wherein the perfluorocarbonsulfonic acid resin is a copolymer comprising a repeating unit represented by $-(CF_2-CF_2)-$ and a repeating unit represented by $-(CF_2-CF(-O-(CF_2CFXO)_n-(CF_2)_m-SO_3H))-$ (wherein X represents F or $CF_3$, n represents an integer of 0 to 5, and m represents an integer of 0 to 12, provided that n and m do not simultaneously represent 0).

(8) A method for producing a solid polymer electrolyte membrane according to 7 above, wherein n is 0 and m is an integer of 1 to 6 in the repeating unit represented by $-(CF_2-CF(-O-(CF_2CFXO)_n-(CF_2)_m-SO_3H))-$.

(9) A method for producing a solid polymer electrolyte membrane according to any one of 1 to 8 above, wherein the polyazole-based compound is at least one compound selected from the group consisting of a polyimidazole-based compound, a polybenzimidazole-based compound, a polybenzobisimidazole-based compound, a polybenzoxazole-based compound, a polyoxazole-based compound, a polythiazole-based compound and a polybenzthiazole-based compound.

(10) A method for producing a solid polymer electrolyte membrane according to 9 above, wherein the polyazole-based compound is a polybenzimidazole-based compound.

(11) A method for producing a solid polymer electrolyte membrane according to any one of 1 to 10 above, wherein the protic solvent is mainly composed of a solvent mixture of water and a protic organic solvent having a boiling point which is not higher than that of water.

(12) A method for producing a solid polymer electrolyte membrane according to 11 above, wherein the polymer electrolyte-containing solution preparation step comprises once distilling off the protic organic solvent having a boiling point which is not higher than that of water from the resulting polymer electrolyte-containing solution to give a protic solvent mainly composed of water, and adding the protic organic solvent again.

(13) A method for producing a solid polymer electrolyte membrane according to any one of 1 to 12 above, wherein, in the polymer electrolyte-containing solution preparation step, a reinforcing material is further added to the protic solvent so that the content of the reinforcing material is from 0.01 to 45 vol % based on the total amount of the component A, the component B and the reinforcing material.

(14) A method for producing a solid polymer electrolyte membrane according to 13 above, wherein the reinforcing material is a short fibrous substance having an aspect ratio of 5 or more.

(15) A method for producing a solid polymer electrolyte membrane according to any one of 1 to 14 above, wherein the membrane formation step comprises impregnating a porous support having a porosity of 40 to 99% made of a reinforcing material with the polymer electrolyte-containing solution.

(16) A solid polymer electrolyte membrane obtained by the method according to any one of 1 to 15 above.

(17) A multi-layer solid polymer electrolyte membrane comprising at least one solid polymer electrolyte membrane according to 16 above.

(18) A membrane electrode assembly comprising the membrane according to 16 or 17 above.

(19) A solid polymer electrolyte fuel cell comprising the membrane electrode assembly according to 18 above.

(20) A polymer electrolyte-containing solution which is obtained by dissolving a perfluorocarbonsulfonic acid resin having an ion-exchange capacity of 0.5 to 3.0 meq/g (component A), a polyazole-based compound (component B) and an alkali metal hydroxide in a protic solvent, a weight ratio of the component A to the component B, (A/B), being from 2.3 to 199, a total weight of the component A and the component B being from 0.5 to 30% by weight.

(21) A polymer electrolyte-containing solution wherein an alkali metal is decreased or substantially removed by subjecting the polymer electrolyte-containing solution according to 20 above to a cation-exchange resin treatment and/or a dialysis treatment using a cation-exchange membrane.

(22) The polymer electrolyte-containing solution according to 20 or 21 above, wherein the polyazole-based compound is at least one compound selected from the group consisting of a polyimidazole-based compound, a polybenzimidazole-based compound, a polybenzobisimidazole-based compound, a polybenzoxazole-based compound, a polyoxazole-based compound, a polythiazole-based compound and a polybenzthiazole-based compound.

The solid polymer electrolyte membrane obtained by the method of the present invention is particularly excellent in durability under high temperature and low humidity conditions of the solid polymer electrolyte fuel cell and is effective as a polymer electrolyte membrane for solid polymer electrolyte fuel cell.

DETAILED DESCRIPTION OF THE INVENTION

The present invention will now be described in detail.

First, the protic solvent, which can be used in the present invention, will be described. The protic solvent used in the present invention refers to a solvent which is dissociated to easily emit protons, for example, water, alcohols, carboxylic acid or fatty acid. Examples of the protic solvent will be listed below, but are not limited thereto as far as they are solvents which are dissociated to easily emit protons. Protic solvents other than water are referred to as protic organic solvents in the present specification.

Examples of the protic solvent include water; aliphatic alcohols such as methanol, ethanol, 1-propanol, 2-propanol, 1-butanol, 2-butanol, isobutyl alcohol, tert-butyl alcohol, 1-pentanol, 2-pentanol, 3-pentanol, 2-methyl-1-butanol, isopentyl alcohol, tert-pentyl alcohol, 3-methyl-2-butanol, neopentyl alcohol, 1-hexanol, 2-methyl-1-pentanol, 4-methyl-2-pentanol, 2-ethyl-1-butanol, 1-heptanol, 2-heptanol, 3-heptanol, 1-octanol, 2-octanol, 2-methyl-1-hexanol, 1-nonanol, 3,5,5-trimethyl-1-hexanol, 1-decanol, 1-undecanol, 1-dodecanol, allyl alcohol, propargyl alcohol, benzyl alcohol, cyclohexanol, 1-methyl-cyclohexanol, 2-methylcyclohexanol, 3-methylcyclohexanol, 4-methylcyclohexanol, α-terpineol, abietinol and fusel oil; solvents having two or more functional groups such as 2-methoxyethanol, 2-ethoxyethanol, 2-(methoxymethoxy)ethanol, 2-isopropoxyethanol, 2-butoxyethanol, 2-(isopentyloxy)ethanol, 2-(hexyloxy)ethanol, 2-phenoxyethanol, 2-(benzyloxy)ethanol, furfuryl alcohol, tetrahydrofurfuryl alcohol, diethylene glycol, diethylene glycol monomethyl ether, diethylene glycol monoethyl ether, diethylene glycol monobutyl ether, triethylene glycol, triethylene glycol monomethyl ether, tetraethylene glycol, polyethylene glycol, 1-methoxy-2-propanol, 1-ethoxy-2-propanol, dipropylene glycol, dipropylene glycol monomethyl ether, dipropylene glycol monoethyl ether, tripropylene glycol monomethyl ether, polypropylene glycol, diacetone alcohol, 2-chloroethanol, 1-chloro-2-propanol, 3-chloro-1,2-propanediol, 1,3-dichloro-2-propanenol, 2,2,2-trifluoroethanol, 3-hydroxypropiononitrile and 2,2'-thiodiethanol; diols such as 1,2-ethanediol, 1,2-propanediol, 1,3-propanediol, 1,2-butanediol, 1,3-butanediol, 1,4-butanediol, 2,3-butanediol, 1,5-pentanediol, 2-butene-1,4-diol, 2-methyl-2,4-pentanediol, 2-ethyl-1,3-hexanediol, glycerin, 2-ethyl-2-(hydroxymethyl)-1,3-propanediol and 1,2,6-hexanetriol; phenols such as phenol, cresol, o-cresol, m-cresol, p-cresol and xylenols; fatty acid-based solvents such as formic acid, acetic acid, propionic acid, butyric acid, isobutyric acid, pivalic acid, valeric acid, isovaleric acid, caproic acid, 2-ethylbutyric acid, caprylic acid, 2-ethylhexanoic acid and oleic acid; and inorganic acids such as sulfuric acid, nitric acid and hydrochloric acid. A small amount of alkylamine or ammonia may be further added to these solvents.

The perfluorocarbonsulfonic acid resin (component A), which can be used in the present invention, is not specifically limited as far as it is a so-called perfluorocarbonsulfonic acid resin, and those obtained by hydrolyzing a perfluorocarbonsulfonic acid resin precursor comprising a copolymer of a fluorinated vinyl ether compound represented by the following formula (1) and a fluorinated olefin monomer represented by the formula (2) are preferable.

$$CF_2=CF-O-(CF_2CFXO)_n-(CF_2)_m-W \qquad (1)$$

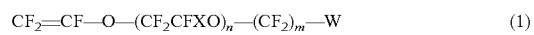

wherein X represents a F atom or a perfluoroalkyl group having 1 to 3 carbon atoms, n represents an integer of 0 to 5, m represents an integer of 0 to 12, provided that n and m do not simultaneously represent 0, and W represents a functional group which can be converted into $SO_3H$ by hydrolysis.

$$CF_2=CFZ \qquad (2)$$

wherein Z represents, H, Cl, F or a perfluoroalkyl group having 1 to 3 carbon atoms.

The functional group, which can be converted into $SO_3H$ by hydrolysis, is preferably $SO_2F$, $SO_2Cl$ or $SO_2Br$. A perfluorocarbonsulfonic acid resin precursor of the above formula in which $X=CF_3$, $W=SO_2F$ and $Z=F$ is preferable, and a perfluorocarbonsulfonic acid resin precursor of the above formula in which n=0, m=an integer of 0 to 6 (provided that n and m do not simultaneously 0), $X=CF_3$, $W=SO_2F$ and $Z=F$ is more preferable because a solution having a high concentration can be obtained.

Such a perfluorocarbonsulfonic acid resin precursor can be synthesized by known means. For example, there are known a method of polymerizing by dissolving and reacting the vinyl fluoride compound and a fluorinated olefin gas using a polymerization solvent such as fluorine-containing hydrocarbon (solution polymerization), a method of polymerizing using the vinyl fluoride compound itself as the polymerization solvent without using the solvent such as fluorine-containing hydrocarbon (bulk polymerization), a method of polymerizing by reacting the vinyl fluoride compound and a fluorinated olefin gas using an aqueous solution of a surfactant as a medium (emulsification polymerization), a method of polymerizing by emulsifying and reacting the vinyl fluoride compound and a fluorinated olefin gas in an aqueous solution of a surfactant and an auxiliary emulsifier such as alcohol (miniemulsion polymerization, microemulsion polymerization) and a method of polymerizing by dispersing and reacting the vinyl fluoride compound and a fluorinated olefin gas in an aqueous solution of a suspension stabilizer (suspension polymerization). In the present invention, those made by any polymerization method can be used.

As the fluorine-containing hydrocarbon used as the polymerization solvent of the solution polymerization, the group of compounds referred to as "CFCs®" such as trichlorotrifluoroethane or 1,1,1,2,3,4,4,5,5,5-decafluoropentane can be preferably used.

In the present invention, the melt mass-flow rate (MFR) can be used as an indicator of the polymerization degree of the perfluorocarbonsulfonic acid resin precursor. The melt mass-flow rate of the perfluorocarbonsulfonic acid resin precursor used in the present invention is preferably 0.01 or more, more preferably 0.1 or more, and still more preferably 0.3 or more. The upper limit of the melt mass-flow rate is not limited, but is preferably 100 or less, more preferably 10 or less, and still more preferably 5 or less. When the melt mass-flow rate is less than 0.01 or more than 100, it may become difficult to perform molding such as membrane formation.

The perfluorocarbonsulfonic acid resin precursor thus obtained is extrusion-molded through a nozzle or a die using an extruder. In this case, a molding method and the shape of a molded article are not specifically limited. However, the molded article is preferably in the form of pellets in size of 0.5 cm$^3$ so as to increase a treating rate in a hydrolysis treatment and an acid treatment described hereinafter.

The perfluorocarbonsulfonic acid resin precursor molded described above is then subjected to a hydrolysis treatment by dipping in a basic reaction solution.

The reaction solution used in the hydrolysis treatment is not specifically limited and an aqueous solution of an amine compound such as dimethylamine, diethylamine, monomethylamine or monoethylamine and an aqueous solution of a hydroxide of an alkali metal or an alkali earth metal are preferable, and sodium hydroxide and potassium hydroxide are particularly preferable. The content of the hydroxide of the alkali metal or alkali earth metal is not specifically limited and is preferably from 10 to 30% by weight. More preferably, the reaction solution contains a swelling organic compound such as methyl alcohol, ethyl alcohol, acetone or DMSO. The content of the swelling organic compound is preferably from 1 to 30% by weight.

The treatment temperature varies depending on the kind and composition of the solvent, and the treatment time can be shortened as the treatment temperature increases. However, when the treatment temperature is too high, the perfluorocarbonsulfonic acid resin precursor is dissolved or drastically swollen, and thus it becomes difficult to be handled. Therefore, the treatment temperature is preferably from 20 to 160° C., and more preferably from 40 to 90° C. The longer the treatment time, the better, because all functional groups capable of being converted into SO$_3$H by hydrolysis are preferably subjected to a hydrolysis treatment so as to obtain high conductivity. However, as productivity is lowered when the treatment time is too long, the treatment time is preferably from 0.1 to 48 hours, and more preferably from 0.2 to 12 hours.

The perfluorocarbonsulfonic acid resin precursor is subjected to a hydrolysis treatment in the basic reaction solution, sufficiently washed with hot water, and then subjected to an acid treatment. The acid used in the acid treatment is preferably a mineral acid such as hydrochloric acid, sulfuric acid or nitric acid, and an organic acid such as oxalic acid, acetic acid, formic acid or trifluoroacetic acid, and more preferably a mixture of these acids and water, but is not specifically limited. Two or more kinds of these acids may be simultaneously used. By this acid treatment, the perfluorocarbonsulfonic acid resin precursor is protonated to give a SO$_3$H compound. It becomes possible to dissolve the perfluorocarbonsulfonic acid resin obtained by protonation in a protic organic solvent, or water, or a mixture of both solvents.

When the perfluorocarbonsulfonic acid resin used in the present invention has too high ion-exchange capacity, the resulting solid polymer electrolyte membrane is drastically swollen under high temperature and high humidity conditions during the operation of the fuel cell. As a result, there arises such a problem that the strength decreases and wrinkles are formed to cause peeling from the electrode and, also, the gas shielding properties are lowered. On the other hand, when the perfluorocarbonsulfonic acid resin has too low ion-exchange capacity, as a generating capacity of a fuel cell with the resulting solid polymer electrolyte membrane decreases, the ion-exchange capacity of the perfluorocarbonsulfonic acid resin is necessarily from 0.5 to 3.0 meq/g, preferably from 0.65 to 2.0 meq/g, and more preferably from 0.8 to 1.5 meq/g.

The polyazole-based compound, which can be used in the present invention, will now be described.

The polyazole-based compound (component B) refers to a polymer of a five-membered heterocyclic compound containing one or more nitrogen atoms in the ring, for example, polyimidazole-based compound, polybenzimidazole-based compound, polybenzobisimidazole-based compound, polybenzoxazole-based compound, polyoxazole-based compound, polythiazole-based compound or polybenzthiazole-based compound, and may contain oxygen and/or sulfur, in addition to nitrogen. Among these compounds, those having at least "—NH—" group and/or "=N—" group in the molecular structure is preferable and those having at least "—NH—" group is particularly preferable in view of solubility of the polyazole-based compound.

In the present invention, those soluble in a protic solvent containing an alkali metal hydroxide dissolved therein are selected. For example, those having very large molecular weight are insoluble in the protic solvent containing the alkali metal hydroxide dissolved therein and are therefore unsuitable. Although the molecular weight of the polyazole-based compound, which can be used in the present invention, varies depending on the structure, those having a weight average molecular weight of 300 to 500000 can be generally used.

In order to improve the thermal resistance, the polyazole-based compound is preferably a polymer comprising, as a repeating unit, a compound obtained by bonding the five-membered heterocyclic compound containing one or more nitrogen atoms in the ring with a divalent aromatic group such as p-phenylene group, m-phenylene group, naphthalene group, diphenylene ether group, diphenylenesulfone group, biphenylene group, terphenyl group or 2,2-bis(4-carboxyphenylene)hexafluoropropane group. Specifically, a polyazole-based compound comprising a polybenzimidazole-based compound is preferable and poly[2,2'-(m-phenylene)-5,5'-bibenzimidazole] is more preferable.

The polyazole-based compound, which can be used in the present invention, may have an ion-exchange group introduced by the following general modification method. The modified polyazole-based compound having an ion-exchange group introduced therein refers to a compound into which at least one of amino group, quaternary ammonium group, carboxyl group, sulfonic acid group and phosphonic acid group is introduced. Introduction of the anionic ion-exchange group into the polyazole resin is effective because ion-exchange capacity of the entire electrolyte membrane can be increased and consequently high output can be obtained during the operation of the fuel cell. The amount of the ion-exchange group to be introduced into the polyazole-based compound is preferably from 0.1 to 1.5 meq/g in terms of the ion-exchange capacity. In the present invention, those easily soluble in an alkali metal hydroxide-containing protic solvent are selected. In the present invention, however, there can be selected those, which are not easily dissolved in water or hot water in the absence of an alkali metal, from the polyazole-based compound or a polyazole compound obtained by modifying the polyazole-based compound. The reason is considered to be as follows. That is, those which are dissolved in water or hot water during power generation under humidication, cause degradation with time after forming into a membrane.

The above polyazole-based compound and modified polyazole-based compound can be used alone, or any of two or more kinds of them can be used in combination.

The method for modification of the polyazole-based compound is not specifically limited. For example, an ion-exchange group may be introduced into a polyazole using fuming sulfuric acid, concentrated sulfuric acid, sulfuric anhydride or a complex thereof, sultones such as propanesultone, α-bromotoluenesulfonic acid or chloroalkylphosphonic acid. Alternatively, those having an ion-exchange group upon the synthesis of a monomer of a polyazole-based compound may be polymerized.

Examples of the alkali metal hydroxide, which can be used in the present invention, include monovalent alkali metal hydroxides such as LiOH, NaOH, KOH, RbOH, CsOH and FrOH. Among these monovalent alkali metal hydroxides, NaOH and KOH are preferable in view of solubility of the polyazole-based compound.

The method for preparing a polymer electrolyte-containing solution of the present invention by dissolving the perfluorocarbonsulfonic acid resin, the polyazole-based compound and the alkali metal hydroxide in the protic solvent is not specifically limited. For example, the perfluorocarbonsulfonic acid resin, the polyazole-based compound and the alkali metal hydroxide may be simultaneously introduced into the protic solvent, or introduced in any order. However, in view of solubility of the polyazole-based compound, a method of previously preparing a protic solvent solution of a perfluorocarbonsulfonic acid resin and a polyazole-based compound and a protic solvent solution of an alkali metal hydroxide and mixing both solutions is preferable.

A method of adding the protic solvent solution of the perfluorocarbonsulfonic acid resin to the protic solvent solution of the polyazole-based compound and the alkali metal hydroxide, followed by mixing is particularly preferable. In case of reversing the order of addition, a large-sized polyazole-based compound may be precipitated, resulting in a non-uniform system as a whole. The membrane formed by using such a polymer electrolyte-containing solution may be slightly inferior in durability because miscibility of the polyazole-based compound is lowered.

The method for preparing a polymer electrolyte-containing solution of the present invention will now be described. First, the method of dissolving a perfluorocarbonsulfonic acid resin in a protic solvent will be described.

The perfluorocarbonsulfonic acid resin protonated by an acid treatment is dissolved using a protic solvent.

The dissolution method is not specifically limited. For example, there can be exemplified a method of adding a perfluorocarbonsulfonic acid resin having an ion-exchange group in solvent alone selected from water and the above protic organic solvents or a solution of the combination thereof in a solid content of 1 to 50% by weight, charging the solution in an autoclave, and with an glass pestle if necessary, replacing an air in a vessel by an inert gas such as nitrogen and heating to an inner temperature within a range from 50° C. to 250° C. for 1 to 12 hours while stirring. The higher the concentration of the perfluorocarbonsulfonic acid resin, the better, in view of yield. However, when the concentration of the perfluorocarbonsulfonic acid resin is increased, the undissolved material may be produced. Therefore, the concentration is preferably within a range from 1 to 40% by weight, more preferably from 1 to 30% by weight, and still more preferably from 3 to 20% by weight.

The solvent used to dissolve the perfluorocarbonsulfonic acid resin may be a solvent alone selected from water and the protic organic solvents, and is preferably water alone. Also a solvent mixture of two or more kinds of them may be used. In the case of using the solvent mixture, a solvent mixture of water and a protic organic solvent is particularly preferable. As the protic organic solvent used to dissolve the perfluorocarbonsulfonic acid resin, aliphatic alcohol are preferable. Among these, methanol, ethanol, 1-propanol, 2-propanol, 1-butanol, 2-butanol, isobutyl alcohol and tert-butyl alcohols are preferable, and methanol, ethanol, 1-propanol and 2-propanol are particularly preferable.

A mixing ratio of water to the protic organic solvent can vary depending on the dissolution method, dissolution conditions, kind of perluorocarbonsulfonic acid resin, solid content of the perfluorocarbonsulfonic acid resin, dissolution temperature and stirring rate. When water is mixed with the protic organic solvent, regarding a weight ratio of the protic organic solvent to water, a ratio of the protic organic solvent is preferably from 0.1 to 10 based on 1 of water, and a ratio of the protic organic solvent is particularly preferably from 0.1 to 5 based on 1 of water.

When only water is used as the solvent, a method of dissolving in an autoclave at the inner temperature of 130 to 250° C. is effective. When using this method, the amount of a decomposition product of an organic solvent and viscosity of the solution after dissolution can be decreased and the system can be made more uniform, thus making it possible to handle at high concentration.

The method of dissolving a polyazole-based compound and alkali metal hydroxide in a protic solvent will now be described.

It is preferred to use the above protic solvent comprising a mixture of the protic organic solvent and water so as to dissolve the polyazole-based compound. However, the solvent is not specifically limited as far as it is excellent in affinity with the polyazole-based compound. As the protic organic solvent suited to dissolve the polyazole-based compound, a solvent having a high boiling point among the protic solvents is not preferable in view of the production process because it requires a high temperature when it is removed. The solvent is preferably a solvent having a boiling point of 250° C. or lower, more preferably a solvent having a boiling point of 200° C. or lower, and particularly preferably a solvent having a boiling point of 120° C. or lower. Water and aliphatic alcohols are particularly preferable. Specific examples thereof include water, methanol, ethanol, 1-propanol, 2-propanol, 1-butanol, 2-butanol, isobutyl alcohol and tert-butyl alcohol.

The dissolution temperature is preferably from 10 to 160° C., and more preferably from 30 to 90° C., in view of the operability. When the dissolution temperature is higher than the boiling point of water and the organic solvent, an autoclave is preferably used. It is preferred to dissolve while stirring.

To dissolve the alkali metal hydroxide, the same solvent as that in case of the polyazole-based compound can be used.

In the present invention, the alkali metal hydroxide may be directly added to a solvent containing the polyazole-based compound dispersed therein, or a solution of the alkali metal hydroxide may be added to the polyazole-based compound. The latter method is preferable so as to uniformly mix the materials.

In case of mixing the polyazole-based compound with the alkali metal hydroxide, the amount of the alkali metal hydroxide to be added is preferably from 1 or more equivalents to 100 or less equivalents per total equivalents of nitrogens which exist in the heterocycle of the polyazole-based compound. When the amount of the alkali metal hydroxide is less than the above range, the undissolved material is produced. On the other hand, when the amount of the alkali metal hydroxide is more than the above range, solubility of the polyazole-based compound is improved, however, the alkali metal hydroxide is precipitated. More preferably, the amount of the alkali metal hydroxide is 2 to 50 equivalents per total equivalents of nitrogens.

Regarding the composition of a solution mixture containing the polyazole-based compound and the alkali metal hydroxide dissolved in the protic solvent, a weight ratio of the protic organic solvent is preferably from 10 to 500 and a weight ratio of water is preferably from 0.05 to 50, based on 1 of polyazole-based compound. More preferably, a weight ratio of the protic organic solvent is from 20 to 400 and a weight ratio of water is from 0.07 to 40. Still more preferably, a weight ratio of the protic organic solvent is from 50 to 200 and a weight ratio of water is from 0.1 to 20.

When the amount of the protic organic solvent is less than the above range, the undissolved material of the polyazole-based compound is produced and dispersibility becomes inferior. When the amount is too large, the concentration of the polyazole-based compound is decreased and productivity is lowered. The amount of water can vary depending on the amount of the alkali metal hydroxide to be added and the alkali metal hydroxide can be added in the form of an aqueous solution.

In the present invention, the polymer electrolyte-containing solution is preferably prepared by adding a solution of the above-described perfluorocarbonsulfonic acid resin to the thus obtained solution mixture of the polyazole-based compound and the alkali metal hydroxide in the protic solvent. The preparation procedure will now be described.

When the concentration of the perfluorocarbonsulfonic acid resin in the polymer electrolyte-containing solution, which can be used in the present invention, is too high, the polyazole-based compound is precipitated. Therefore, the concentration of the solution of the perfluorocarbonsulfonic acid resin, which is used for mixing, is preferably from 1 to 50% by weight, more preferably from 2 to 30% by weight, and particularly preferably from 3 to 20% by weight. A weight ratio of the perfluorocarbonsulfonic acid resin (component A) to the polyazole-based compound (component B), (component A)/(component B), in the polymer electrolyte-containing solution is preferably from 2.3 to 199, more preferably from 5.6 to 199, and particularly preferably from 19 to 199. A total content of the component A and the component B in the polymer electrolyte-containing solution is preferably from 0.5 to 30% by weight, more preferably 1 to 25% by weight, and still more preferably from 3 to 25% by weight.

The amount of the alkali metal hydroxide to be added is not specifically limited. In the composition of a solution mixture obtained by dissolving the polyazole-based compound and the alkali metal hydroxide in the protic solvent, the amount of the alkali metal hydroxide is preferably adjusted within a range from 1 to 100 equivalents per equivalent of nitrogen atoms in the polyazole-based compound. When the amount is too small, solubility of the polyazole-based compound is lowered. On the other hand, when the amount is too large, a metal hydroxide is precipitated in the solution or during membrane formation, and thus the strength of the membrane decreases. When the amount of the alkali metal oxide is particularly large, membrane forming properties drastically deteriorate and uneven thickness and membrane cracking occur. Therefore, the alkali metal hydroxide is preferably added so that the amount of a sulfonate in the perfluorocarbonsulfonic acid resin reacted with the alkali metal hydroxide in the final solution mixture is 100% or less, and more preferably 80% or less, based on all the sulfonic acid groups in the perfluorocarbonsulfonic acid resin component.

As described hereinafter, when the alkali metal ions are decreased or removed by an ion-exchange resin treatment or a dialysis treatment using an ion-exchange membrane, with respect to the composition of a solution mixture obtained by dissolving the alkali metal hydroxide to be added to the polyazole-based compound in the protic solvent, the amount of the alkali metal hydroxide can be adjusted to a sufficiently excess equivalent per equivalent of nitrogen atoms in the polyazole-based compound as far as dissolution is not adversely affected. The amount of the alkali metal hydroxide is preferably from 1 to 10,000 equivalents, more preferably form 1 to 1,000 equivalents, and still more preferably from 1 to 100 equivalents, per equivalent of nitrogen atoms in the polyazole-based compound. It is preferably adjusted so that the amount of the sulfonate in the perfluorocarbonsulfonic acid resin reacted with the alkali metal hydroxide in the final solution mixture after the treatment for removal of metal ions is 100% or less, preferably 50% or less, more preferably 10% or less, and still more preferably 1% or less, based on the entire sulfonic acid groups in the perfluorocarbonsulfonic acid resin component.

When the sulfonic acid group neutralization equivalent is 50% or more, as the amount of sulfonic acid required for ionic conduction decreases, the membrane is preferably subjected to an acid treatment after the membrane formation.

When a solution of the perfluorocarbonsulfonic acid resin is added to a solution mixture of the polyazole-based compound and the alkali metal hydroxide, the solution is preferably added sufficiently slowly or while stirring so as not to cause a local concentration distribution.

In the present invention, in order to enhance uniformity of the polymer electrolyte-containing solution containing high concentration of the perfluorocarbonsulfonic acid resin, it is preferred to add the solution of the perfluorocarbonsulfonic acid resin to the solution of the polyazole-based compound and the alkali metal hydroxide by at least two or more portions.

Specifically, it is possible to mix the components by a first mixing step of adding a solution obtained by dissolving a perfluorocarbonsulfonic acid resin (component A) having the ion-exchange group amount of 0.5 to 3.0 meq/g in the protic solvent to a solution obtained by dissolving a polyazole-based compound (component B) and an alkali metal hydroxide in the amount of 1 to 100 equivalents per equivalent of nitrogen atoms in the polyazole-based compound so that a weight ratio of the component A to the component B, (A/B), is from 1 to 198, followed by mixing with stirring; and a second mixing step of adding a solution obtained by dissolving the component A in a protic solvent so that a weight ratio of the component A to the component B, (A/B), in the final is from 2.3 to 199 and the total weight of the component A and the component B is from 0.5 to 30% by weight, followed by mixing with stirring.

It is also possible to add a solution prepared by using water having high solubility in a perfluorocarbonsulfonic acid resin as a main protic solvent and increasing the concentration of the perfluorocarbonsulfonic acid resin to the solution mixture of the polyazole-based compound and the alkali metal hydroxide.

It is preferred to sufficiently stir, in the case of adding the solution, so as to obtain a uniformly dispersed solution. The stirring temperature is not specifically limited. When the stirring temperature is too high, the polyazole-based compound is non-uniformly precipitated. On the other hand, when the stirring temperature is too low, viscosity increases and uniform stirring cannot be conducted. Therefore, the stirring temperature is preferably from −10 to 100° C., and more preferably from 10 to 50° C.

The polymer electrolyte membrane for solid polymer electrolyte fuel cell obtained by using the polymer electrolyte-containing solution of the present invention is a membrane which is excellent in dispersibility of the polyazole-based compound in the membrane and is also excellent in durability as compared with the prior art.

In the present invention, the polymer electrolyte-containing solution itself can be concentrated by any method. Examples of the concentration method include, but are not limited to, a method of vaporizing a solvent by heating, a method of concentrating under reduced pressure and a pervaporation method. When using a solvent mixture of water and a protic organic solvent having a boiling point lower than that of water, the protic organic solvent is distilled off by concentration, thus making it possible to prepare a polymer electrolyte-containing solution comprising a protic solvent composed of water mainly. In this case, it is preferred to add a suitable protic organic solvent immediately before membrane formation so as to improve filtration properties and membrane forming properties of the polymer electrolyte-containing solution.

When the total amount of the polyazole-based compound and the perfluorocarbonsulfonic acid resin in the resulting polymer electrolyte-containing solution is too large as a result of the concentration, the viscosity increases and it becomes difficult to handle. On the other hand, when the total amount is too small, productivity is lowered. Therefore, the total amount of the both in the final is from 0.5 to 30% by weight, preferably from 1 to 25% by weight, and still more preferably from 2 to 20% by weight.

To prevent gelation (thickening) due to vaporization of the protic solvent in the polymer electrolyte-containing solution or to prevent gelation (thickening) due to variation with time during storage, at least one selected from ethylene glycol, propylene glycol, glycerin, and derivatives thereof is preferably used as a high boiling point protic solvent in the content of 50 vol % or less based on the entire protic solvent.

The polymer electrolyte-containing solution, which can be used in the present invention, refers to a solution which contains a perfluorocarbonsulfonic acid resin and a polyazole-based compound dissolved or finely dispersed therein and is free from visually confirmable coarse materials, and is also clear and free from precipitation layers and precipitates in the bottom of a glass vial tube even when 20 ml of the solution is allowed to stand in the glass vial tube at 25° C. for 7 days. Viscosity of the polymer electrolyte-containing solution varies depending on a membrane formation apparatus. When employing a method of casting a polymer electrolyte-containing solution on a film support and drying with transporting, a predetermined membrane cannot be obtained and mottles are formed on the membrane when the viscosity is too high or too low. Therefore, viscosity of the polymer electrolyte-containing solution used in the present invention is preferably from 2 to 10000 cp, more preferably from 100 to 5000 cp, and particularly preferably from 500 to 3000 cp.

In the present invention, the state where a portion of the perfluorocarbonsulfonic acid resin is reacted with a portion of the polyazole-based compound (for example, chemically bonded state such as state where an ion complex of an acid and a base is formed by ionic bonding) is more preferable. Examples of the state include the state where a sulfonic acid group of the perfluorocarbonsulfonic acid resin is ionic-bonded with nitrogens in the respective reactive groups such as imidazole group, oxazole group and thiazole group in the polyazole-based compound.

It is possible to confirm whether or not a portion of the perfluorocarbonsulfonic acid resin is reacted with a portion of the polyazole-based compound, using Fourier-transform infrared spectrometer (hereinafter referred to as FT-IR). In case a peak shifted from intrinsic peaks of the perfluorocarbonsulfonic acid resin and the polyazole-based compound is observed when the membrane of the present invention is measured by FT-IR, it is possible to consider that it is in the state where a portion of the perfluorocarbonsulfonic acid resin is reacted with a portion of the polyazole-based compound. When poly[2,2'-(m-phenylene)-5,5'-bibenzimidazole] (hereinafter referred to as PBI) is used as the polyazole-based compound, shifted absorption peaks assigned to a chemical bond between a sulfone group in the perfluorocarbonsulfonic acid resin and an imidazole group in PBI are observed at about 1458 cm$^{-1}$, 1567 cm$^{-1}$ or 1634 cm$^{-1}$.

When the membrane with these absorption peaks and chemical bonds is subjected to a dynamic viscoelasticity test, a peak temperature (Tg) of loss tangent Tan δ obtained in the process of heating from room temperature to 200° C. increases as compared with a membrane with no absorption peak because of no addition of the polyazole-based compound. It is known that an increase in Tg arises when a chemical bond between a sulfonic acid group of the perfluorocarbonsulfonic acid resin and a metal ion or an organic matter ion is formed. In the present invention, when PBI is used as the polyazole-based compound, as a result of a chemical bond between a sulfonic acid group of the perfluorocarbonsulfonic acid resin and nitrogen in an imidazole group in PBI, it is considered that Tg is increased by binding a portion of the perfluorocarbonsulfonic acid resin as a main chain. That is, this chemical bond binds a portion of the perfluorocarbonsulfonic acid resin, exerts the effect of a crosslink point, and contributes to an improvement in water resistance and heat resistance and an enhancement of the mechanical strength. It is considered that it finally exerts an effect on an improvement in durability during the operation of the cell.

In the present invention, it is possible to obtain a polymer electrolyte-containing solution, which is substantially free from an alkali metal, by further treating the solution of the polyazole-based compound and the perfluorocarbonsulfonic acid resin with a cation-exchange resin. The polymer electrolyte-containing solution thus obtained is excellent in stability with time of the solution as compared with the solution which is not subjected to the treatment, and the membrane formed by using the polymer electrolyte-containing solution can exhibit excellent electrical characteristics without passing through the acid washing process in the following stage.

The cation-exchange resin is not specifically limited as far as it is a resin having cation-exchange capacity and is preferably a resin which is not substantially dissolved in a protic solvent used in case of preparing the polymer electrolyte-containing solution. To exhibit a capacity capable of removing an alkali metal component more effectively, the resin is more preferably a strong acidic cation-exchange resin. Examples of the strong acidic cation-exchange resin include resins having a sulfonic acid group therein. Among these resins, a crosslinked cation-exchange resin having a sulfonic acid group is particularly preferable.

The form of the cation-exchange resin is not specifically limited and examples of the cation-exchange resin include gel type, porous type, highly-porous type and carrier supporting type ion-exchange resins. To make separation of the cation-exchange resin from the treated solution easy, the resin is preferably in the form of block or beads.

Specific examples of commercially available products thereof include Diaion SK series, PK series and HPK25 (manufactured by Mitsubishi Chemical Corporation), Amberlight IR120B and 200CT (manufactured by Organo Corp.) and Dowex (manufactured by The Dow Chemical Company).

Furthermore, two or more kinds of these cation-exchange resins may be used successively or simultaneously.

The method of treating the polymer electrolyte-containing solution with the cation-exchange resin includes, for example, a method of introducing the cation-exchange resin into the polymer electrolyte-containing solution. In this case, the solution may be heated, if necessary. It is more preferred to stir the solution so as to enhance efficiency of removing the alkali metal component. If the cation-exchange resin and the alkali metal component are strongly bonded and elution does not arise again, a solution mixture in this state may be used for membrane formation as it is. It is more preferred to subject it to the process of separating the solution and ion-exchange resin after the completion of this process. The separation method may be any method of separating a solid and a liquid and specific examples thereof include a method of recovering a supernatant liquid by decantation, a method of removing by filtration using a filter paper, a filter cloth or a porous filter, and a method of separating by centrifugation. It is preferred that the cation-exchange resin is regenerated and recycled.

In addition to these methods, for example, a method of making a column packed with a cation-exchange resin and passing a solution through the column is also preferable. In this case, it is also possible to deliver the solution while applying pressure so as to increase treatment efficiency.

A quantitative ratio of the cation-exchange resin to be used and the solution to be treated varies depending on the desired removal degree of the alkali metal component. To make the effect of the present invention clear, it is preferred to substantially remove the alkali metal component from the solution as much as possible, and it is particularly preferred to remove the alkali metal component so that viscosity stability of the polymer electrolyte-containing solution is maintained or the strength of the membrane is not decreased when the membrane is formed. In that case, the equivalent of the cation-exchange resin is preferably 1 or more, more preferably 1.5 or more, and still more preferably 2 or more, per equivalent of the alkali metal component contained in the solution to be treated.

It is also effective to dialyze using the cation-exchange membrane. The membrane used for dialysis may be a cation-exchange membrane, and a perfluorosulfonic acid membrane, a perfluorocarboxylic acid membrane and a styrene-sulfonic acid membrane are preferably used. A dialysis method utilizing a difference in concentration may be used, and an electrodialysis method of optionally applying a potential between cells isolated with a cation-exchange membrane is also preferable.

The cation-exchange resin treatment and the dialysis treatment using the cation-exchange membrane may be used in combination. In some cases, it is also possible to remove the alkali metal component in the equivalent larger than the total equivalents of the azole component and the perfluorocarbon-sulfonic acid component in the polymer electrolyte-containing solution using a known dialysis membrane (cellulose or parchment paper) and to remove the residual alkali metal component using the ion-exchange resin and/or the dialysis method using the ion-exchange membrane.

The resulting polymer electrolyte-containing solution in which the alkali metal component is decreased or substantially removed may be formed into a membrane as it is, or the solid content or the composition of the solvent may be adjusted by concentration and/or dilution, if necessary.

The method of forming a membrane using the resulting polymer electrolyte-containing solution will now be described.

The membrane formation method includes a method of spreading a polymer electrolyte-containing solution over a vessel such as petri dish, and distilling off at least a portion of a solvent by optionally heating in an oven, following by peeling off from the vessel to obtain a membrane-like material. It is also possible to form a uniform sheet-like coated membrane by casting a polymer electrolyte-containing solution onto a glass plate or a film while controlling the thickness of the membrane using an apparatus such as blade coater, gravure coater or comma coater equipped with a mechanism such as blade, air knife or reverse roll. It is also possible to form a continuous film-like membrane by continuously casting it.

An extrusion membrane formation method of forming a membrane by extruding a polymer electrolyte-containing solution through a die can also be employed, and a sheet-like or continuous membrane can be formed by the extrusion membrane formation method. It is also possible to form a membrane by spraying the solution over a releasable support, drying to form a membrane and optionally subjecting to hot pressing thereby to consolidate the membrane.

It is also possible to control the thickness of the membrane again by a blade or an air knife before subjecting the membrane formed by casting or extrusion to a drying treatment described hereinafter.

As the method of removing the solvent contained in the membrane thus formed, there can also be employed a solvent dipping method of putting the membrane into a proper solution or solvent thereby to remove the solvent.

The membrane formation method can be selected according to the viscosity or other properties of the solution and is not specifically limited. A multi-layered membrane may be formed by forming membrane plural times from polymer electrolyte-containing solutions having different component ratios using any method and laminating the resulting membranes.

It is preferred to subject the polymer electrolyte-containing solution to a pretreatment such as removal of bubbles by a vacuum degassing method or a centrifugation method before forming a membrane so as to control the thickness of the membrane. It is also possible to add a high boiling point solvent having a boiling point higher than that of water so as to facilitate removal of bubbles or make the thickness of the film uniform.

It is also possible to form a membrane by impregnating a reinforcing material having continuous pores in the form of fabric, nonwoven fabric, porous material or fibers with the polymer electrolyte-containing solution of the present invention. Although the membrane formed by the present invention itself has sufficient strength, dimensional stability, deterioration resistance, mechanical strength, and durability during fuel cell operation at high temperature under high pressure can be improved by adding the above reinforcing material. A multi-layered material obtained by laminating non-reinforced layers and reinforced layers by any method is preferable.

Examples of the reinforcing material include polyethylene terephthalate (PET), polybutylene terephthalate (PBT), polyethylene naphthalate (PEN) and polyesters containing liquid crystal polyester, triacetyl cellulose (TAC), polyallylate, polyether, polycarbonate (PC), polysulfone, polyethersulfone, cellophane, aromaticpolyamide, polyvinyl alcohol, polyethylene (PE), polypropylene (PP), polyvinyl chloride (PVC), polystyrene (PS), acrylonitrile-butadiene-styrene copolymer (ABS), polymethyl methacrylate (PMMA), polyamide, polyacetal (POM), polyphenylene ether (PPE), polybutylene terephthalate (PBT), polyphenylene sulfide (PPS), polyamide imide (PAI), polyetheramide (PEA), polyether ether ketone (PEEK), polyimide (PI), polymethylpentene (PMP), polytetrafluoroethylene (PTFE), fluorinated ethylene-propylene (FEP), tetrafluoroethylene-ethylene copolymer (ETFE), polyvinylidene fluoride (PVDF), polybenzazole (PBZ), polybenzoxazole (PBO), polybenzthiazole (PBT), polybenzimidazole (PBI) and polyparaphenylene terephthalimide (PPTA). Examples of the other reinforcing material include polysulfone (PSU), polyimide (PI), polyphenylene oxide (PPO), polyphenylene sulfoxide (PPSO), polyphenylene sulfide (PPS), polyphenylene sulfide sulfone (PPS/SO$_2$), polyparaphenylene (PPP), polyphenyl quinoxaline (PPQ), polyaryl ketone (PK), polyether ketone (PEK), polyether sulfone (PES), polyether ether sulfone (PEES), polyarylsulfone, polyarylether sulfone (PAS), polyphenyl sulfone (PPSU) and polyphenylene sulfone (PPSO$_2$). As the polyimide, polyetherimide and fluorinated polyimide are preferable. As the polyether ketone, polyether ketone (PEK), polyether ether ketone (PEEK), polyether ketone-ketone (PEKK), polyether ether ketone-ketone (PEEKK) and polyether ketone ether ketone-ketone (PEKEKK) are preferable. Examples of the inorganic reinforcing material include basic magnesium, magnesium, magnesium borate, titanium diboride, graphite or aluminum oxide and hydrate thereof, silicone oxide, titanium oxide, silicon carbide, silicon nitride, boron nitride, potassium titanate, aluminum borate, zinc oxide and magnesium sulfate, and composite materials thereof. In the present invention, the reinforcing material refers to a reinforcing material having an ion-exchange capacity of 0.5 meq/g or less.

When using these reinforcing materials, it is possible to incorporate an ionic group such as a sulfonic acid group or an amine group into the surface of the reinforcing material and to treat the reinforcing material with a coupling agent so as to enhance affinity and interfacial adhesion with the total resin components of the components A and B contained in the polymer electrolyte-containing solution of the present invention, or impregnation properties of the polymer electrolyte-containing solution. To enhance interfacial adhesion, an ion-exchange group may be uniformly introduced into a portion or all of the reinforcing material thereby to impart an ion-exchange capacity of 0.5 meq/g or less.

When a porous material is used as the reinforcing material and is impregnated with the solution of the present invention, porosity is preferably higher so as to enhance ionic conductivity of the membrane. However, too high a porosity reduces the reinforcing effect and therefore the porosity is preferably from 40 to 99%, and more preferably from 50 to 98%.

A membrane can be formed by dispersing a short fiber-like reinforcing material in the polymer electrolyte-containing solution of the present invention. In this case, a higher aspect ratio (length/fiber diameter) of the short fiber is effective to improve the mechanical strength, suppress dimensional change in a planar direction during hydration and improve the life during cell operation. Therefore, the aspect ratio is preferably 5 or more. As described above, when a membrane is formed after dispersing the short fiber-like reinforcing material in the polymer electrolyte-containing solution and the process of treating with the cation-exchange resin is employed, a membrane is preferably formed by dispersing the reinforcing material in the polymer electrolyte-containing solution obtained through the treatment with the cation-exchange resin.

In this case, when the content of the reinforcing material component in the polymer electrolyte-containing solution is too large, ionic conductivity is lowered, resulting in low output during cell operation. On the other hand, when the content is too small, the reinforcing effect is lowered. Therefore, the content of the total resin components of the components A and B is preferably adjusted within a range from 45 to 98 vol %, more preferably from 55 to 95 vol %, and the reinforcing material component is preferably adjusted within a range from 2 to 55 vol %, more preferably from 5 to 45 vol %, based on the total of the components A and B and the reinforcing material component contained in the polymer electrolyte-containing solution.

It is also possible to form a membrane containing a reinforcer dispersed therein by the following procedure. In any stage during the process for production of the polymer electrolyte membrane of the present invention, a solution, which is prepared by dissolving another reinforcer, on which a protic solvent in a polymer electrolyte-containing solution acts as a poor solvent, in a protic solvent, is added dropwise in the polymer electrolyte-containing solution with stirring, or the polymer electrolyte-containing solution is added dropwise in the solution prepared by dissolving the another reinforcer in the protic solvent, thereby to cause phase separation of the reinforcer and to precipitate fine fibrous materials having any shape. The resulting solution mixture is uniformly dispersed and mixed, and then is cast or sprayed while maintaining the shape of the reinforcer by preferentially retaining the poor solvent, thereby to form a membrane, and thereafter the membrane is dried.

A multi-layered material obtained by laminating reinforced layers with non-reinforced layers by any method is also preferable. In this case, the non-reinforced layer is preferably employed as the surface layer so as to maintain adhesion with an electrode.

In the present invention, the membrane formed by the above procedure is dried with heating.

When the solvent is removed from the membrane by drying with heating, a dry membrane, that is, a polymer electrolyte membrane suited for a solid polymer electrolyte fuel cell of the present invention is obtained.

The heat-drying temperature is preferably from 40 to 250° C. In case of too high temperature or rapid heating, bubbles and thickness unevenness arise during drying and thus a normal polymer electrolyte membrane having uniform thickness accuracy can not be obtained. When the heat-drying temperature is too low, the drying time is extended and productivity is lowered. This heat-drying process can be conducted in two or three stages. There can also be employed a method of forming a polymer electrolyte membrane having uniform thickness at first stage and heating the membrane at higher temperature. When using this method, a polymer electrolyte membrane, which is free from dry mottles and has good flatness, can be obtained by decreasing the drying temperature at the first stage and extending the drying time.

The heat-drying process is conducted in hot air or low humidity air. Drying is conducted in the state of being restricted by a tenter or a metal frame, or in the state of no restriction, for example, drying is conducted on a support to which the membrane of the present invention does not adhere or using a floating method utilizing an air flow.

The polymer electrolyte membrane suited for the solid polymer electrolyte fuel cell obtained by the method described above is subjected to a heat-drying treatment to give a uniform membrane. When the polymer electrolyte membrane has insufficient mechanical strength during membrane formation, metal sheets or belts, or films or belts made of polymer materials such as polyethylene terephthalate, polyaramid, polyimide, polyethylene naphthalate and polytetrafluoroethylene can be used as an easy-to-peel support regardless of the continuous or sheet-like membrane.

The polymer electrolyte membrane suited for the solid polymer electrolyte fuel cell obtained by the method described above is optionally subjected to the washing process of washing with an acid and/or water at any stage after membrane formation.

Washing with the acid is conducted so as to generate an ion-exchange group by removing unrequired metal and organic matter ions bonded to the ion-exchange group in the membrane. Therefore, when using the solution having low neutralization degree of the sulfonic acid, or the solution obtained by decreasing or substantially removing the alkali metal component, such as a solution obtained by treating with the ion-exchange resin, if sufficient ion-exchange capacity is obtained without washing with the acid, it is not necessary to wash with the acid.

As the acid used for washing with the acid, for example, there can be used inorganic acids such as hydrochloric acid, sulfuric acid, nitric acid, phosphoric acid, hydrogen peroxide, phosphonic acid and phosphinic acid; and organic acids such as tartaric acid, oxalic acid, acetic acid, formic acid, trifluoroacetic acid, aspartic acid, aminobenzoic acid, aminoethylphosphonic acid, inosine, glycerinphosphoric acid, diaminobutyric acid, dichloroacetic acid, cysteine, dimethylcysteine, nitroaniline, nitroacetic acid, picric acid, picolinic acid, histidine, bipyridine, pyrazine, proline, maleic acid, methanesulfonic acid, trifluoromethanesulfonic acid, toluenesulfonic acid and trichloroacetic acid alone, or solutions prepared by dissolving these inorganic acids and organic acids in water, methyl ethyl ketone, acetonitrile, propylene carbonate, nitromethane, dimethyl-sulfoxide, N,N-dimethyl-formamide, N-methyl-2-pyrrolidone, pyridine, methanol, ethanol and acetone. Among these, those prepared by dissolving an inorganic acid or an organic acid in water is particularly preferable.

It is preferred that the pH at 25° C. of these acids is 2 or less. The washing temperature is within a range from 0 to 160° C. When the washing temperature is too low, the reaction is extended and the polyazole-based compound is discomposed and a chemical bond between the perfluorocarbonsulfonic acid resin and the functional group of the polyazole-based compound is lost, and thus durability enhanced by the chemical bond may disappear. Therefore, the treatment temperature is preferably from 5 to 140° C., and more preferably from 15 to 80° C. In case of acid washing at high temperature, an acid-resistant autoclave is preferably used.

The membrane of the present invention has a feature such that, as the polymer electrolyte-containing solution of the protic solvent is used, there are fewer hard-to-eliminate impurities reacted strongly with the ion-exchange group and the ion-exchange group is simply formed as compared with a conventional method using an aprotic solvent.

Washing with water is optionally conducted. In case of washing with the acid, washing with water is conducted for the purpose of removing the acid remained in the membrane. Even when washing with the acid is not conducted, washing with water can be conducted for the purpose of removing impurities in the membrane.

The solvent used for washing is particularly preferably water and various organic solvents having the pH within a range from 1 to 7 can also be used. When water is used for washing, a sufficient amount of pure water having conductivity of 0.06 μS/cm or less is preferably used and washing is preferably conducted until the pH of wash water is within a range from 6 to 7.

When the section of the electrolyte membrane for solid polymer electrolyte fuel cell (portion containing no reinforcing material when using the reinforcing material) is observed using a transmission or scanning electron microscopy, particles composed mainly of the polyazole-based compound can be partially observed in the perfluorocarbonsulfonic acid resin, and particles having an average particle size of 1 μm or less are uniformly dispersed. In case of the membrane in which particles having a large average particle size of 2 μm or more are not uniformly dispersed, the mechanical strength is insufficient and microvoids are formed during fuel cell operation thereby to cause cross leakage of hydrogen gas. The smaller the average particle size of particles, the better. However, it is technically difficult to control the average particle size to 0.001 μm or less. The particle size is more preferably from 0.005 μm to 0.7 μm, and still more preferably from 0.01 μm to 0.5 μm.

The polymer electrolyte membrane suited for the solid polymer electrolyte fuel cell of the present invention can be drawn under proper conditions by a known method after membrane formation and dimensional change upon swelling can be reduced by drawing. The same effect as that of drawing may be exerted by drying in a restricted state after swelling. Before and after regeneration of the ion-exchange group due to acid washing, the membrane may be treated in any atmosphere such as inert gas or air atmosphere or in the presence of a crosslinking agent at 100 to 250° C. for optional time, thereby to be partially heat-crosslinked (reacted).

When the polymer electrolyte membrane suited for the solid polymer electrolyte fuel cell of the present invention has too high cation-exchange capacity, the membrane swells during the operation of the fuel cell thereby to cause problems such as decrease in strength and peeling from the electrode due to wrinkles. On the other hand, when the membrane has too low a cation-exchange capacity, generating capacity of the fuel cell is lowered. Therefore the ion-exchange capacity is from 0.5 to 3.0 meq/g, preferably from 0.65 to 2.0 meq/g, and still more preferably from 0.8 to 1.5 meq/g.

When the polymer electrolyte membrane suited for the solid polymer electrolyte fuel cell of the present invention has too small thickness, the strength decreases and barrier function of preventing the direct reaction due to penetration of a fuel such as hydrogen and methanol or oxygen is lowered. On the other hand, when the membrane has too large thickness, conductivity is lowered and generating capacity of the fuel cell is lowered. Therefore, the thickness is preferably from 1 to 200 μm, and more preferably from 10 to 100 μm.

When the ionic conductivity is too low, the generating capacity of the fuel cell is lowered. Therefore, the ionic conductivity is 0.05 S/cm or more, preferably 0.10 S/cm or more, and more preferably 0.15 S/cm or more.

The method for producing a membrane electrode assembly (MEA) using the polymer electrolyte membrane for solid polymer electrolyte fuel cell of the present invention will now be described.

MEA is produced by connecting an electrode to both surfaces of the polymer electrolyte membrane for solid polymer electrolyte fuel cell of the present invention.

The electrode is composed of microparticles made of a catalyst metal and a conductive material on which the microparticles made of a catalyst metal is supported, and optionally contains a water repellent. The catalyst used for the electrode is not specifically limited as far as it is a metal which promotes the oxidation reaction of hydrogen and the reductive reaction due to oxygen and examples thereof include platinum, gold, silver, palladium, iridium, rhodium, ruthenium, iron, cobalt, nickel, chromium, tungsten, manganese, vanadium, or alloys thereof.

Among these metals, platinum is mainly used. The conductive material is not specifically limited as far as it is an electron conductive substance and examples thereof include various metals and carbon materials. Examples of the carbon material include carbon black such as furnace black, channel black or acetylene black, activated carbon and graphite, and these carbon materials are used alone or in combination.

The water repellent is preferably a fluorine-containing resin having water repellency, and is more preferably a resin which is excellent in heat resistance and oxidation resistance. Examples thereof include polytetrafluoroethylene, tetrafluoroethylene-perfluoroalkyl vinyl ether copolymer and tetrafluoroethylene-hexafluoropropylene copolymer.

As the electrode, there can be used a so-called electrode catalyst layer obtained by dispersing a platinum-supported carbon serving as an electrode substance in a solution prepared by dissolving a fluorinated ion-exchange resin as a binder in a solution mixture of an alcohol and water to obtain a paste and applying a fixed amount of the paste onto a PTFE sheet, followed by drying.

As the fluorinated ion-exchange resin used as the binder, a conventionally known perfluorocarbonsulfonic acid resin, which can be used for the electrolyte membrane for solid polymer electrolyte fuel cell, may be used and the polymer electrolyte-containing solution of the present invention can be also used.

To produce MEA by connecting the above electrode to the electrolyte membrane for solid polymer electrolyte fuel cell of the present invention, the following method can be used, specifically.

A paste obtained by dispersing commercially available platinum-supported carbon (TEC10E40E, manufactured by Tanaka Kikinzoku Kogyo Co., Ltd.) as a catalyst in a solution prepared by dissolving a perfluorocarbonsulfonic acid polymer in a solution mixture of an alcohol and water is applied on a PTFE sheet to obtain an electrode. The polymer electrolyte membrane for solid polymer electrolyte fuel cell of the present invention is interposed between the two electrodes, coated surfaces thereof facing each other, followed by connection by hot pressing. The hot pressing temperature is from 100 to 200° C., preferably 120° C. or higher, and more preferably 140° C. or higher. After connection, the PTFE sheet is removed to obtain MEA. The above method for producing MEA is described, for example, in JOURNAL OF APPLIED ELECTROCHEMISTRY, 22 (1992), p. 1-7. The method is not limited thereto and any solvent and electrolyte solution may be applied and then dried.

MEA produced by the method described above can also be used after forming a gas diffusion layer outside an electrode catalyst layer as an outermost layer.

As the gas diffusion layer, a commercially available carbon cloth or carbon paper can be used. Examples of the gas diffusion layer include carbon cross E-tek, B-1, CARBEL® (manufactured by JAPAN GORE-TEX INC.), TGP-H (manufactured by Toray Industries, Inc.) and carbon paper 2050 (SPCTRACORP Co.).

A structure in which the electrode catalyst layer and the gas diffusion layer are integrated is referred to as a gas diffusion electrode, and MEA can also be obtained by connecting the gas diffusion electrode to the polymer electrolyte membrane of the present invention. Examples of the gas diffusion electrode include gas diffusion electrode ELAT® (manufactured by DE NORA NORTH AMERICA Co.).

Using the resulting MEA, a solid polymer electrolyte fuel cell is produced by the following procedure and the cell is evaluated.

The solid polymer electrolyte fuel cell is composed of MEA, a current collector, a fuel cell frame and a gas supplying apparatus. Among these components, the current collector (bipolar plate) refers to a graphite or metal separator having a gas passageway on the surface. It transports electrons to an external load circuit and also has a function as a passageway which supplies hydrogen and oxygen to the MEA surface. A fuel cell can be produced by interposing MEA into these current collectors, followed by lamination of plural stacks. The method for producing a solid polymer electrolyte fuel cell is described, for example, in "FUEL CELL HANDBOOK" (VAN NOSTRAND REINHOLD, A. J. APPLEBY et. al, ISBN 0-442-31926-6) and "Chemistry One Point, FUEL CELL (Second Edition)" (edited by Masao TANIGUCHI and Manabu SENOO, KYORITSU SHUPPAN CO., LTD. (1992)).

The fuel cell is operated by supplying hydrogen to one electrode and supplying oxygen or air to the other electrode. The higher the operation temperature of the fuel cell, the better, because the catalytic activity increases. However, usually, the fuel cell is operated at a temperature of 50° C. to 100° C. at which the water content is easily controlled. The higher the supply pressure of oxygen and hydrogen, the more output of the fuel cell increases, and therefore it is preferred. However, since both electrodes may come into contact after breakage of the membrane, the supply pressure is preferably adjusted to within a suitable range.

The method for producing a polymer electrolyte membrane suited for solid polymer electrolyte fuel cell of the present invention, MEA having the electrolyte membrane for solid polymer electrolyte fuel cell obtained by the method, and a solid polymer type fuel cell were described.

The polymer electrolyte membrane for solid polymer electrolyte fuel cell of the present invention, which is prepared by using a polymer electrolyte-containing solution containing a protic solvent and is composed of a perfluorocarbonsulfonic acid resin containing a polyazole-based compound, has high durability as compared with an conventional electrolyte membrane which is prepared by using a polymer electrolyte-containing solution containing a protic solvent and is composed of a perfluorocarbonsulfonic acid resin containing no polyazole-based compound. Also a solid polymer electrolyte fuel cell using a polymer electrolyte membrane of the present invention exhibits high initial generated voltage and high generated current as compared with a solid polymer electrolyte fuel cell using a conventional polymer electrolyte membrane composed of perfluorocarbonsulfonic acid resin containing a polyazole-based compound prepared by using an aprotic solvent. That is, the solid polymer electrolyte fuel cell using the electrolyte membrane for solid polymer electrolyte fuel cell of the present invention simultaneously satisfies both performances, initial generated voltage and high durability.

The present invention will now be described in detail by way of examples, but the present invention is not limited to the following examples. The procedures for testing various physical properties in the present invention are as follows.

(1) Membrane Thickness

An acid type polymer electrolyte membrane is allowed to stand in a thermostatic chamber at 23° C. under 65% RH for 12 or more hours thereby to attain equilibrium, and then the thickness of the membrane is measured using a thickness tester (manufactured by Toyo Seiki Seisaku-Sho, Ltd.: B-1).

(2) Ion-Exchange Capacity

An acid type polymer electrolyte membrane (2 to 10 cm$^2$) is dipped in 50 ml of an aqueous saturated NaCl solution at 25° C., allowed to stand while stirring for 10 minutes and then subjected to neutralization titration with an aqueous 0.01N sodium hydroxide solution which is conducted using phenolphthalein as an indicator. After neutralization, the resulting Na type polymer electrolyte membrane is rinsed with pure water, vacuum-dried and then weighed. Ion-exchange capacity (meq/g) is determined by the following equation:

$$\text{Ion-exchange capacity} = 1000/((W/M)-22)$$

where M represents an equivalent (mmol) of sodium hydroxide required for neutralization and W represents a weight (mg) of a Na type polymer electrolyte membrane.

(3) Melt Mass-Flow Rate (MFR)

According to JIS K-7210, a melt mass-flow rate MFR (g/10 min.) of a perfluorocarbonsulfonic acid resin precursor is measured at a temperature of 270° C. and a load of 2.16 kg.

(4) Solid Content

The weight $W_0$ of a weighing bottle is accurately measured. After putting 10 g of the measured material in the weighing bottle, the weight $W_1$ is accurately measured. The material is dried at a temperature of 110° C. and vacuum degree of 0.10 MPa or less for 3 hours and cooled in a desiccator packed with silica gel. After cooling to room temperature, the weight $W_2$ is accurately measured without allowing water absorption. The solid content (%) is determined by the following formula: $(W_2-W_0)/(W_1-W_0)$ The measurement was conducted 5 times and the resulting values were averaged.

(5) Measurement of Absorbance

After degassing a solution to be measured, an absorbance of a quartz cell having an optical path length of 10 mm in an air is measured as a control and an absorbance (ABS) at 850 nm of the solution placed in the same cell is measured, using a UV-VIS absorbance measuring apparatus (manufactured by JASCO Corporation, V-550). The absorbance can be determined by the formula: $\log(I_1/I_0)$ where $I_0$ represents a transmitted light intensity of the control and $I_1$ represents a transmitted light intensity of the solution to be measured.

(6) Measurement of Ionic Conductivity

A membrane sample is cut out in a wet state (state immediately after dipping in a water bath at a temperature of 80° C. for 2 hours) and the thickness is measured. The sample thus obtained is assembled into a two-terminal conductivity measuring cell for measuring conductivity in a longitudinal direction of a membrane measuring 1 cm in width by 5 cm in length. This cell is placed in ion-exchanged water at 80° C. and a resistance value r of a real number component at a frequency of 10 kHz is measured by an alternating current impedance method, and then ionic conductivity σ is derived from the following formula:

$$\sigma = 1/(r \times t \times w)$$

where

σ: ionic conductivity (S/cm)

t: thickness (cm)

r: resistance value (Ω)

l (=5): membrane length (cm)

w (=1): membrane width (cm)

(7) Measurement of Dispersion State

After embedding a polymer electrolyte membrane for solid polymer electrolyte fuel cell to be measured in an epoxy resin, an ultrathin section is cut out perpendicularly to the membrane surface using an ultramicrotome, and dispersed particles mainly composed of a polyazole-based compound in a dispersion state are observed at an acceleration voltage of 125 kV using a transmission electron microscopy (manufactured by Hitachi, Ltd., H7100). When a reinforcer exists, the portion free from the reinforcer is evaluated. A particle size is determined by averaging a major axis and a minor axis, which perpendicularly intersect each other, and particles present in the area 100 μm squares at 3 or more different positions are measured and averaged to obtain an average particle size.

(8) Infrared Absorption Spectrum Analytical Method

Using a membrane having a thickness of 10 to 60 μm to be measured, a spectrum at a wavelength within a range from 4000 cm$^{-1}$ to 800 cm$^{-1}$ is measured by a FT-IR absorbance measuring apparatus (manufactured by JASCO Corporation, FT-IR460).

(9) Measurement of Viscosity

Using a E type rotational viscometer (manufactured by TOKI SANGYO CO., LTD., TV-20 cone plate type), viscosity (cp) at 1 rpm is measured at a measuring temperature of 25° C.

(10) Measurement of Polyazole Content

A polyazole component in a polyazole solution is precipitated in a poor solvent such as water of the polyazole solution, sufficiently washed with the same poor solvent and then sufficiently dried. The polyazole component is sufficiently ground and is dissolved in a deuterated solvent capable of dissolving in the concentration of 0.5 to 1%. The structure is decided by measuring the solution using FT-NMR (Fourier Transform-Nuclear Magnetic Resonance, EX-270 type FT-NMR (manufactured by JEOL Ltd.)).

Nitrogen content in the solution is determined by an organic elemental analytical method (elemental analytical apparatus, Model: YANAKO CHN CODE R MT-5 type (manufactured by Yanagimoto Co., Ltd.)) and the polyazole resin content in the solution is calculated from the azole structure.

(11) Determination of Alkali Metal Hydroxide Content

Using various samples containing different amounts of an alkali metal hydroxide in the polymer electrolyte-containing solution of the present invention, the measurement is conducted by a plasma emission spectrophotometer (ICPS-7000, manufactured by Shimadzu Corporation) and a calibration curve of the concentration of the alkali metal hydroxide added and an absorbance was made. Then, the absorbance of the polymer electrolyte-containing solution of the present invention was measured and the content was decided from the calibration curve.

(12) Measurement of Water Content

Water content in a polymer electrolyte-containing solution of the present invention is measured by using a Carl-Fischer water analyzer (MKS-20, manufactured by KYOTO ELECTRONICS MANUFACTURING CO.).

(13) Measurement of Protic Organic Solvent

A protic solvent other than water in a polymer electrolyte-containing solution of the present invention is analyzed and determined by gas chromatography (GC-14A, manufactured by Shimadzu Corporation).

(14) Measurement of Variation in Falling Ball Viscosity with Time

Falling ball viscosity of a polymer electrolyte-containing solution of the present invention can be measured by the following procedure. When a ball having a diameter of a and a density of $\rho$ is dropped in a liquid having a density of $\rho 0$, the ball drops at a constant velocity in a steady state. A falling ball viscosity $\eta$ of the liquid is determined from a ball velocity v after reaching this constant velocity by the following equation.

$$\eta = 2a^2(\rho - \rho 0)g/9v$$

where g represents a gravitational acceleration. In this example, the falling ball viscosity is measured using a glass bulb having a diameter of 5 mm and a weight of 0.165 g as a ball to be dropped. Furthermore, a solution is stored during opening and a ratio $\eta 1/\eta 0$ (where $\eta 0$ represents falling ball viscosity immediately after preparation and $\eta 1$ represents the falling ball viscosity after standing for one day) is employed as an indicator of long-term viscosity stability. Samples where the ratio is from 0.95 to 1.05 are rated as stable.

(15) Evaluation of Fuel Cell

The operation of a solid polymer electrolyte fuel cell using a polymer electrolyte membrane for solid polymer type fuel cell of the present invention was evaluated in the following manner. A polymer electrolyte membrane for solid polymer electrolyte fuel cell is interposed between two gas diffusion electrodes, followed by hot pressing at 160° C. under a pressure of 50 kg/cm² to obtain MEA. The gas diffusion electrode used is obtained by applying a 5 wt % perfluorosulfonic acid resin solution SS910 (manufactured by Asahi Kasei Corporation, EW: 910, composition of solvent (% by weight): ethanol/water=50/50) onto a gas diffusion electrode ELAT® manufactured by DE NORA NORTH AMERICA, USA (amount of Pt supported: 0.4 mg/cm²), followed by fixation with drying in an atmospheric air at 140° C. (amount of polymer supported: 0.8 mg/cm²).

The resulting MEA is interposed between graphite separators with a gas passageway on the surface and assembled into an evaluation cell interposed between metal fuel cell frames, and then mounted to an evaluation apparatus. Specifically, using a hydrogen gas as a fuel and an air gas as an oxidizing agent, a single-cell characteristic test (initial voltage: about 0.65 V, current density: 0.3 A/cm²) of MEA is conducted at a cell temperature of 100° C. under a pressure of 0.2 MPa (absolute pressure) at both anode and cathode sides. In case of gas humidification, both hydrogen gas and air are humidified at 60° C. using a water bubbling system, and hydrogen gas is supplied to the anode side at a flow rate of 74 cc/min and air is supplied to the cathode side at a flow rate of 102 cc/min in the cell. Then, stability of an initial voltage, height of a voltage, decrease in voltage with time, and decrease in generating capacity due to rapid decrease in voltage caused by hydrogen leak through the electrolyte membrane were observed. The operation was terminated when the generated voltage decreased to 0.25 V or less. Regarding samples where satisfactory operation time exceeds 1000 hours, an evaluation state at 1000 hours was employed as the evaluation result.

Example and Comparative Examples will now be described. Physical properties of Examples and Comparative Examples are summarized in Table 1.

Example 1

A perfluorocarbonsulfonic acid resin precursor comprising a copolymer (MFR=3) of a vinyl fluoride compound ($CF_2$=CF—O—($CF_2$)$_2$—$SO_2$F) of the formula (1) wherein n=0, m=2 and W=$SO_2$F and a fluorinated olefin ($CF_2$=$CF_2$) of the formula (2) wherein Z=F was melt-kneaded using an extruder, extruded through a round spinneret at 270° C., cooled with water at room temperature and then cut into cylindrical pellets having a diameter of 2 to 3 mm and a length of 4 to 5 mm. The resulting perfluorocarbonsulfonic acid resin precursor pellets were dipped in an aqueous solution having a KOH concentration of 15% by weight and a DMSO concentration of 30% by weight at 95° C. for 6 hours, thereby converting $SO_2$F into $SO_3$K.

The treated pellets were dipped in 1N—HCl at 60° C. for 6 hours, washed with ion-exchanged water at 60° C. and then dried to obtain a perfluorocarbonsulfonic acid resin (ion-exchange capacity=1.39 meq/g) having a proton-exchange group in which $SO_3$K is converted into $SO_3$H.

The treated perfluorocarbonsulfonic acid resin was placed in an autoclave so that the composition comprises 5% by weight of a solid content, 47.5% by weight of ethanol and 47.5% by weight of water, followed by treatment with stirring at 180° C. for 4 hours to obtain a uniform solution of the perfluorocarbonsulfonic acid resin. The resulting solution is referred to as a perfluorocarbonsulfonic acid resin solution AS1.

To 100 g of the perfluorocarbonsulfonic acid resin solution AS1, 100 g of pure water was added and, after stirring, this solution was concentrated while heating to 80° C. with stirring until the solid content reaches 10% by weight. The resulting solution is referred to as a perfluorocarbonsulfonic acid resin solution AS2.

0.1 g of polybenzimidazole (manufactured by SIGMA-ALDRICH JAPAN Corp., weight average molecular weight: 27000, abbreviated to PBI) was sufficiently ground and 1 g of an aqueous 8 wt % NaOH solution and 2 g of ethanol were added. The polybenzimidazole was sufficiently dissolved by heating at 80° C. with stirring for one hour, followed by the addition of 7.5 g of ethanol and heating at 80° C. with stirring. As a result, polybenzimidazole was dissolved to obtain 10 g of a reddish brown polybenzimidazole solution. The resulting solution is referred to as a polyazole resin solution BS1.

To 10 g of the polyazole resin solution BS1, a mixture of 10 g of the perfluorocarbonsulfonic acid resin solution AS1 and 50 g of ethanol (manufactured by Wako Pure Chemicals Industries, Ltd., guaranteed reagent) was added to obtain a pale reddish brown and clear solution. To the solution, 84 g of the concentrated perfluorocarbonsulfonic acid resin solution AS2 was added with stirring. The resulting dispersion solution was a yellow clear solution.

The yellow clear solution was concentrated while heating to 80° C. with stirring to obtain a solution having a water content of 71% by weight, an ethanol content of 19% by weight and a solid content of 10% by weight. As a result, the resulting polymer electrolyte-containing solution was a yellow clear solution and the absorbance was 0.08. The viscosity was 1000 cp.

37.3 g of the resulting polymer electrolyte-containing solution was uniformly spread over a petri dish made of SUS316 having a width of 20 cm and a length of 20 cm, dried on a hot plate at 80° C. for 2 hours and then subjected to a heat treatment in a hot air oven at 180° C. for one hour.

After cooling, the resulting membrane was peeled off, subjected to acid washing by dipping in an aqueous 2 mol/l HCl solution (manufactured by Wako Pure Chemicals Industries, Ltd.) at 25° C. for 8 hours, sufficiently washed with ion-exchanged water and then dried under an environment of 25° C. and 35% RH.

The membrane thus obtained was a transparent membrane having a uniformly pale brown color, and the thickness was about 50 μm and the conductivity was high such as 0.23 S/cm. The dispersion state of the membrane thus obtained was measured. As a result, the average particle size of PBI was 0.2 μm and particles were dispersed very uniformly.

Infrared absorption spectrum analysis revealed chemical bonds (peaks at about 1458 $cm^{-1}$, about 1567 $cm^{-1}$ and about 1634 $cm^{-1}$).

Using this membrane, MEA was made and mounted to a fuel cell single-cell evaluation apparatus, and then a fuel cell characteristic test was conducted using a hydrogen gas and an air. Similar to Comparative Example 1 described hereinafter, the generated voltage showed a fixed excellent value of 0.64 V immediately after starting and was stable. The fuel cell showed high generated voltage for 1000 or more hours and the voltage was 0.60 V after operating for 1000 hours. It was possible to further operate without causing a change with time.

Example 2

In the same manner as in Example 1, a membrane subjected to a heat treatment at 180° C. for one hour was made. After cooling, the resulting membrane was peeled off from a petri dish, subjected to acid washing by dipping in an aqueous 1N-trifluoroacetic acid solution (pH=0.6) at 25° C. for 8 hours, sufficiently washed with ion-exchanged water and then dried in an environment of 25° C. and 35% RH.

The membrane thus obtained was a transparent membrane having a uniformly pale brown color, and the thickness was about 50 μm and the conductivity was high such as 0.23 S/cm. The dispersion state of the membrane thus obtained was the same as that in Example 1.

Infrared absorption spectrum analysis revealed chemical bonds (peaks at about 1458 $cm^{-1}$, about 1567 $cm^{-1}$ and about 1634 $cm^{-1}$).

Using this membrane, MEA was made and mounted to a fuel cell single-cell evaluation apparatus, and then a fuel cell characteristic test was conducted using a hydrogen gas and an air. Similar to Comparative Example 1 described hereinafter, the generated voltage showed a fixed excellent value of 0.64 V immediately after starting and was stable. The fuel cell could be satisfactorily operated in the same manner as in Example 1 and the voltage was 0.58 V after operating for 1000 hours.

Example 3

A perfluorocarbonsulfonic acid resin precursor comprising a copolymer (MFR=20) of a vinyl fluoride compound ($CF_2$=CF—O—($CF_2$CFXO)—($CF_2$)$_2$—$SO_2$F) of the formula (1) wherein X=$CF_3$, n=1, m=2 and W=$SO_2$F and a fluorinated olefin ($CF_2$=$CF_2$) of the formula (2) wherein Z=F was melt-kneaded using an extruder, extruded through a round spinneret at 270° C., cooled with water at room temperature and then cut into cylindrical pellets having a diameter of 1 to 3 mm and a length of 4 to 6 mm.

The resulting perfluorocarbonsulfonic acid resin precursor pellets were dipped in an aqueous solution having a KOH concentration of 15% by weight and a DMSO concentration of 30% by weight at 95° C. for 6 hours, thereby converting $SO_2$F into $SO_3$K.

The treated pellets were dipped in 1N—HCl at 60° C. for 6 hours, washed with ion-exchanged water at 60° C. and then dried to obtain a perfluorocarbonsulfonic acid resin (ion-exchange capacity=1.11 meq/g) having a proton-exchange group in which $SO_3$K is converted into $SO_3$H.

The treated perfluorocarbonsulfonic acid resin was placed in an autoclave so that the composition upon charging comprises 5% by weight of a solid content, 47.5% by weight of ethanol and 47.5% by weight of water, followed by treatment with stirring at 180° C. for 4 hours and further natural cooling with stirring to obtain a uniform perfluorocarbonsulfonic acid resin solution. The resulting solution is referred to as a perfluorocarbonsulfonic acid resin solution AS3.

To 100 g of the perfluorocarbonsulfonic acid resin solution AS3, 100 g of pure water was added and, after stirring, this solution was concentrated while heating to 80° C. with stirring until the solid content reaches 10% by weight. The resulting solution is referred to as a perfluorocarbonsulfonic acid resin solution AS4.

0.1 g of polybenzimidazole (hereinafter abbreviated to PBI, manufactured by SIGMA-ALDRICH JAPAN Corp., weight average molecular weight: 27000) was sufficiently ground and 7 g of an aqueous 8 wt % NaOH solution and 4 g of ethanol were added. The polybenzimidazole was sufficiently dissolved by heating at 80° C. with stirring for one hour, followed by the addition of 15 g of ethanol and heating at 80° C. with stirring. As a result, polybenzimidazole was dissolved to obtain 23 g of a reddish brown polybenzimidazole solution. The resulting solution is referred to as a polyazole resin solution BS2.

To 23 g of the polyazole resin solution BS2, a mixture of 23 g of the solution AS3 and 115 g of ethanol (manufactured by Wako Pure Chemicals Industries, Ltd., guaranteed reagent) was added to obtain a pale reddish brown and clear solution. To the solution, 80 g of the concentrated perfluorocarbonsulfonic acid resin solution AS4 was added with stirring. The resulting solution was a yellow clear solution (dispersion solution).

The yellow clear solution thus obtained was concentrated while heating to 80° C. with stirring until the solid content reaches 10% by weight. The water content was 70% by weight and the ethanol content was 20% by weight. The viscosity was 980 cp.

As a result, the resulting polymer electrolyte-containing solution was a yellow clear dispersion solution and the absorbance was 0.08.

37.3 g of the resulting polymer electrolyte-containing solution was uniformly spread over a petri dish made of SUS316 having a width of 20 cm and a length of 20 cm, dried on a hot plate at 80° C. for 2 hours and then subjected to a heat treatment in a hot air oven at 180° C. for one hour.

After cooling and adding ion-exchanged water in a petri dish, the resulting membrane was peeled and removed, subjected to acid washing by dipping in an aqueous 1 mol/l HCl solution (manufactured by Wako Pure Chemicals Industries, Ltd.) at 25° C. for 8 hours, sufficiently washed with ion-exchanged water and then dried under an environment of 25° C. and 35% RH.

The membrane thus obtained was a transparent membrane having a uniformly pale brown color, and the thickness was about 50 μm and the conductivity was 0.18 S/cm. The dispersion state of the membrane thus obtained was measured. As a result, the average particle size was 0.2 μm and particles were dispersed uniformly. Infrared absorption spectrum analysis revealed chemical bonds (peaks at about 1458 cm$^{-1}$, about 1567 cm$^{-1}$ and about 1634 cm$^{-1}$).

Using this membrane, MEA was made and mounted to a fuel cell single-cell evaluation apparatus, and then a fuel cell characteristic test was conducted using hydrogen gas and an air. Similar to Comparative Example 1 described hereinafter, the generated voltage showed a fixed excellent value of 0.62 V immediately after starting and was stable. The fuel cell could be satisfactorily operated in the same manner as in Example 1 and the voltage was 0.59 V after operating for 1000 hours.

Example 4

In the same manner as in Example 1, except that 10 g of the polyazole resin solution BS1 was added to a mixture of 10 g of the perfluorocarbonsulfonic acid resin solution AS1 prepared in the same manner as in Example 1 and 50 g of ethanol (manufactured by Wako Pure Chemicals Industries, Ltd., guaranteed reagent) so that the method of adding AS1 and BS1 were reversed, a polymer electrolyte-containing solution having a solid content of 10% by weight was prepared. The water content was 70% by weight and the ethanol content was 20% by weight. The resulting polymer electrolyte-containing solution was a yellow clear solution and the absorbance was 0.10.

37.3 g of the resulting polymer electrolyte-containing solution was uniformly spread over a petri dish made of SUS316 having a width of 20 cm and a length of 20 cm, dried on a hot plate at 80° C. for 2 hours and then subjected to a heat treatment in a hot air oven at 180° C. for one hour.

After cooling and adding ion-exchanged water in a petri dish, the resulting membrane was peeled and removed, dipped in an aqueous 1 mol/l HCl solution (manufactured by Wako Pure Chemicals Industries, Ltd.) at 25° C. for 8 hours, sufficiently washed with ion-exchanged water and then dried under an environment of 25° C. and 35% RH.

The membrane thus obtained was a transparent membrane having a uniformly pale brown color, and the thickness was about 50 μm and the conductivity was as high as 0.23 S/cm. The dispersion state of the membrane thus obtained was measured. As a result, the average particle size was 0.3 μm.

Infrared absorption spectrum analysis revealed chemical bonds (peaks at about 1458 cm$^{-1}$, about 1567 cm$^{-1}$ and about 1634 cm$^{-1}$).

Using this membrane, MEA was made and mounted to a fuel cell single-cell evaluation apparatus, and then a fuel cell characteristic test was conducted using a hydrogen gas and an air. Similar to Comparative Example 1 described hereinafter, the generated voltage showed a fixed excellent value of 0.65 V immediately after starting and was stable. The fuel cell could be satisfactorily operated for 1000 or more hours and the voltage was 0.61 V after operating for 1000 hours.

Example 5

1 g of polybenzimidazole (manufactured by SIGMA-ALDRICH JAPAN Corp., weight average molecular weight: 27000) was sufficiently ground and placed in 100 ml of 98 wt % sulfuric acid (manufactured by Wako Pure Chemicals Industries, Ltd., guaranteed reagent), followed by stirring at 100° C. for 8 hours. The solution was poured into excess ion-exchanged water to produce a precipitate. This precipitate was collected and repeatedly washed with ion-exchanged water several times, and then the product was dried at room temperature to obtain a sulfonated polybenzimidazole. The ion-exchange capacity of the sulfonated polybenzimidazole was measured. It was 1.06 meq/g.

In the same manner as in Example 1, except that BS3 was prepared by using this sulfonated polybenzimidazole in place of the polybenzimidazole, a polymer electrolyte-containing solution having a solid content of 10% by weight was obtained. This polymer electrolyte-containing solution had an absorbance of 0.08. In the same manner as in Example 1, a polymer electrolyte membrane was obtained by using this polymer electrolyte-containing solution.

The polymer electrolyte membrane thus obtained was a transparent membrane having a uniform pale brown color and the thickness was about 50 μm. The conductivity was high such as 0.24 S/cm as compared with the case where the sulfonated polybenzimidazole is not used. The dispersion state of the membrane thus obtained was measured. As a result, the average particle size was 0.2 μm.

Infrared absorption spectrum analysis revealed chemical bonds (peaks at about 1458 cm$^{-1}$, about 1567 cm$^{-1}$ and about 1634 cm$^{-1}$).

Using this membrane, MEA was made and mounted to a fuel cell single-cell evaluation apparatus, and then a fuel cell characteristic test was conducted using a hydrogen gas and an air. Similar to Comparative Example 1 described hereinafter, the generated voltage showed a fixed excellent value of 0.66 V immediately after starting and was stable. The fuel cell could be satisfactorily operated for 1000 or more hours and the voltage was 0.57 V after operating for 1000 hours.

Example 6

0.1 g of polyparaphenylenebenzobisoxazole (number average molecular weight: 1000) was sufficiently ground and dipped in a solution mixture of 1 g of an aqueous 8 wt % NaOH solution and 9.5 g of ethanol, followed by stirring with heating at 80° C. for one hour to obtain a solution of polyparaphenylenebenzobisoxazole. The resulting solution is referred to as a polyazole resin solution BS4. In the same manner as in Example 1, except that BS4 was used in place of BS1 in Example 1, a solid polymer electrolyte membrane was obtained.

The polymer electrolyte membrane thus obtained was a transparent membrane having a uniform pale brown color and the thickness was about 50 μm, and the conductivity was high such as 0.23 S/cm. The dispersion state of the membrane thus obtained was measured. As a result, the average particle size was 0.2 μm and particles were very uniformly dispersed.

Using this membrane, MEA was made and mounted to a fuel cell single-cell evaluation apparatus, and then a fuel cell characteristic test was conducted using a hydrogen gas and an air. Similar to Comparative Example 1 described hereinafter, the generated voltage showed a fixed excellent value of 0.63 V immediately after starting and was stable. The fuel cell could be satisfactorily operated for 1000 or more hours and the voltage was 0.55 V after operating for 1000 hours.

Example 7

In the same manner as in Example 3, a perfluorocarbonsulfonic acid resin solution AS3 was prepared and 1000 g of pure water was added to 1000 g of the perfluorocarbonsulfonic acid resin solution AS3. After stirring, this solution was concentrated with heating to 95° C. until the solid content reaches 30% by weight. The concentrated perfluorocarbonsulfonic acid resin solution is referred to as a solution AS5. In the same manner as in Example 1, a polybenzimidazole solution BS1 (30 g) was prepared.

A mixture of 30 g of the solution AS3 and 150 g of ethanol (manufactured by Wako Pure Chemicals Industries, Ltd., guaranteed reagent) was added to the solution BS1 to obtain a pale reddish brown clear solution. To the solution, 84 g of the concentrated perfluorocarbonsulfonic acid resin solution AS5 was added with stirring. The resulting solution was a yellow clear solution (dispersion solution).

The yellow clear solution thus obtained was concentrated while heating to 95° C. with stirring until the solid content reaches 20% by weight. As a result, the water content was 66% by weight and the ethanol content was 14% by weight. The resulting polymer electrolyte-containing solution was a yellow clear dispersion solution and the absorbance was 0.10.

18.6 g of the resulting polymer electrolyte-containing solution was uniformly spread over a petri dish made of SUS316 having a width of 20 cm and a length of 20 cm, dried on a hot plate at 80° C. for 2 hours and then subjected to a heat treatment in a hot air oven at 180° C. for one hour.

After cooling and adding ion-exchanged water in a petri dish, the resulting membrane was peeled and removed, dipped in an aqueous 1 mol/l HCl solution (manufactured by Wako Pure Chemicals Industries, Ltd.) at 25° C. for 8 hours, sufficiently washed with ion-exchanged water and then dried under an environment of 25° C. and 35% RH.

The membrane thus obtained was a transparent membrane having a uniformly pale brown color, and the thickness was about 50 μm and the conductivity was 0.18 S/cm. The dispersion state of the membrane thus obtained was measured. As a result, the average particle size was 0.3 μm and particles were dispersed uniformly. Infrared absorption spectrum analysis revealed chemical bonds (peaks at about 1458 $cm^{-1}$, about 1567 $cm^{-1}$ and about 1634 $cm^{-1}$).

Using this membrane, MEA was made and mounted to a fuel cell single-cell evaluation apparatus, and then a fuel cell characteristic test was conducted using a hydrogen gas and an air. Similar to Comparative Example 1 described hereinafter, the generated voltage showed a fixed excellent value of 0.61 V immediately after starting and was stable. The fuel cell could be satisfactorily operated for 1000 or more hours and the voltage was 0.55 V after operating for 1000 hours.

Example 8

In the same manner as in Example 1, a perfluorocarbonsulfonic acid resin solution AS1, a concentrated perfluorocarbonsulfonic acid resin solution AS2 and a polyazole resin solution BS1 were prepared.

A mixture of 100 g of the solution AS1 and 500 g of ethanol (manufactured by Wako Pure Chemicals Industries, Ltd., guaranteed reagent) was added to 100 g of the polybenzimidazole solution BS1 to obtain a pale reddish brown and clear solution. To the solution, 130 g of the concentrated perfluorocarbonsulfonic acid resin solution AS2 was added with stirring. The resulting polymer electrolyte-containing solution was a yellow clear dispersion solution and the absorbance was 0.11.

164 g of the resulting polymer electrolyte-containing solution was uniformly spread over a petri dish made of SUS316 having a width of 20 cm and a length of 20 cm, dried on a hot plate at 80° C. for 2 hours and then subjected to a heat treatment in a hot air oven at 180° C. for one hour.

After cooling and adding ion-exchanged water in a petri dish, the resulting membrane was peeled and removed, dipped in an aqueous 1 mol/l HCl solution (manufactured by Wako Pure Chemicals Industries, Ltd.) at 25° C. for 8 hours, sufficiently washed with ion-exchanged water and then dried under an environment of 25° C. and 35% RH.

The membrane thus obtained was a transparent membrane having a uniformly pale brown color, and the thickness was about 50 μm and the conductivity was 0.20 S/cm. The dispersion state of the membrane thus obtained was measured. As a result, the average particle size was 0.4 μm and particles were dispersed uniformly. Infrared absorption spectrum analysis revealed chemical bonds (peaks at about 1458 $cm^{-1}$, about 1567 $cm^{-1}$ and about 1634 $cm^{-1}$).

Using this membrane, MEA was made and mounted to a fuel cell single-cell evaluation apparatus, and then a fuel cell characteristic test was conducted using hydrogen gas and an air. Similar to Comparative Example 1 described hereinafter, the generated voltage showed a fixed excellent value of 0.62 V immediately after starting and was stable. The fuel cell could be satisfactorily operated for 1000 or more hours and the voltage was 0.57 V after operating for 1000 hours.

Example 9

In the same manner as in Example 3, a perfluorocarbonsulfonic acid resin solution AS3 was prepared. 1 g of polybenzimidazole (hereinafter abbreviated to PBI, manufactured by SIGMA-ALDRICH JAPAN Corp., weight average molecular weight: 27000) was sufficiently ground and 5 g of an aqueous 8 wt % NaOH solution and 20 g of ethanol were added. The polybenzimidazole was sufficiently dissolved by heating at 80° C. with stirring for one hour, followed by the addition of 160 g of ethanol and heating at 80° C. with stirring. As a result, polybenzimidazole was dissolved to obtain a reddish brown polybenzimidazole solution. The resulting solution is referred to as a polyazole resin solution BS5.

A mixture of 78 g of the solution AS3 and 390 g of ethanol (manufactured by Wako Pure Chemicals Industries, Ltd., guaranteed reagent) was added to 100 g of the polybenzimidazole solution BS5 to obtain a pale reddish brown clear polymer electrolyte-containing solution having an absorbance of 0.12.

477 g of the resulting polymer electrolyte-containing solution was uniformly spread over a petri dish made of SUS316 having a width of 20 cm and a length of 20 cm, dried on a hot plate at 80° C. for 2 hours and then subjected to a heat treatment in a hot air oven at 180° C. for one hour.

After cooling and adding ion-exchanged water in a petri dish, the resulting membrane was peeled and removed, dipped in an aqueous 1 mol/l HCl solution (manufactured by Wako Pure Chemicals Industries, Ltd.) at 25° C. for 8 hours, sufficiently washed with ion-exchanged water and then dried under an environment of 25° C. and 35% RH.

The membrane thus obtained was a transparent membrane having a uniformly pale brown color, and the thickness was about 50 μm and the conductivity was 0.17 S/cm. The dispersion state of the membrane thus obtained was measured. As a result, the average particle size was 0.4 μm and particles were dispersed uniformly. Infrared absorption spectrum analysis revealed chemical bonds (peaks at about 1458 $cm^{-1}$, about 1567 $cm^{-1}$ and about 1634 $cm^{-1}$).

Using this membrane, MEA was made and mounted to a fuel cell single-cell evaluation apparatus, and then a fuel cell characteristic test was conducted using hydrogen gas and an air. Similar to Comparative Example 1 described hereinafter, the generated voltage showed a fixed excellent value of 0.61 V immediately after starting and was stable. The fuel cell could be satisfactorily operated for 1000 or more hours and the voltage was 0.57 V after operating for 1000 hours.

Example 10

In the same manner as in Example 1, a perfluorocarbonsulfonic acid resin solution AS1 and a polyazole resin solution BS1 were prepared. 25 g of ethanol was added to 5 g of BS1 and, after adding 92 g of AS1, 31.5 g of water was added. This solution was concentrated until the solid content reaches 14% by weight. To the solution, 33 g of isopropyl alcohol (IPA) was added to obtain a polymer electrolyte-containing solution. The solid content was 10.4% by weight, the water content was 63.7% by weight, and the content of IPA as a protic solvent other than water was 25.9% by weight.

61 g of the resulting polymer electrolyte-containing solution was uniformly spread over a petri dish made of SUS316 having a width of 20 cm and a length of 20 cm, dried on a hot plate at 80° C. for 2 hours and then subjected to a heat treatment in a hot air oven at 180° C. for one hour.

After cooling, the resulting membrane was peeled off, subjected to acid washing by dipping in an aqueous 2 mol/l HCl solution (manufactured by Wako Pure Chemicals Industries, Ltd.) at 25° C. for 8 hours, sufficiently washed with ion-exchanged water and then dried under an environment of 25° C. and 35% RH.

The membrane thus obtained was a transparent membrane having a uniformly pale brown color, and the thickness was about 50 μm and the conductivity was as high as 0.23 S/cm. The dispersion state of the membrane thus obtained was measured. As a result, the average particle size was 0.2 μm and particles were dispersed very uniformly.

Infrared absorption spectrum analysis revealed chemical bonds (peaks at about 1458 cm$^{-1}$, about 1567 cm$^{-1}$ and about 1634 cm$^{-1}$).

Using this membrane, MEA was made and mounted to a fuel cell single-cell evaluation apparatus, and then a fuel cell characteristic test was conducted using a hydrogen gas and an air. Similar to Comparative Example 1 described hereinafter, the generated voltage showed a fixed value immediately after starting and was stable. The fuel cell could be satisfactorily operated for 1000 or more hours.

Example 11

In the same manner as in Example 1, perfluorocarbonsulfonic acid resin solutions AS1 and AS2, and a polyazole resin solution BS1 were prepared. 50 g of ethanol was added to 10 g of BS1 and, after adding 10 g of AS1, 84 g of AS2 was added with stirring. This solution was concentrated until the solid content reached 13% by weight. To the solution, 21 g of isopropyl alcohol (IPA) was added to obtain a polymer electrolyte-containing solution. The solid content was 10.0% by weight, the water content was 66.7% by weight, and the content of IPA as a protic solvent other than water was 23.3% by weight.

61 g of the resulting polymer electrolyte-containing solution was uniformly spread over a petri dish made of SUS316 having a width of 20 cm and a length of 20 cm, dried on a hot plate at 80° C. for 2 hours and then subjected to a heat treatment in a hot air oven at 180° C. for one hour.

After cooling, the resulting membrane was peeled off, subjected to acid washing by dipping in an aqueous 2 mol/l HCl solution (manufactured by Wako Pure Chemicals Industries, Ltd.) at 25° C. for 8 hours, sufficiently washed with ion-exchanged water and then dried under an environment of 25° C. and 35% RH.

The membrane thus obtained was a transparent membrane having a uniformly pale brown color, and the thickness was about 50 μm and the conductivity was high such as 0.22 S/cm. The dispersion state of the membrane thus obtained was measured. As a result, the average particle size was 0.15 μm and particles were dispersed very uniformly.

Infrared absorption spectrum analysis revealed chemical bonds (peaks at about 1458 cm$^{-1}$, about 1567 cm$^{-1}$ and about 1634 cm$^{-1}$).

Using this membrane, MEA was made and mounted to a fuel cell single-cell evaluation apparatus, and then a fuel cell characteristic test was conducted using a hydrogen gas and an air. Similar to Comparative Example 1 described hereinafter, the generated voltage showed a fixed value of 0.63 V immediately after starting and was stable. The fuel cell could be satisfactorily operated for 1000 or more hours and the voltage was 0.60 V after operating for 1000 hours.

Example 12

In the same manner as in Example 1, perfluorocarbonsulfonic acid resin solutions AS1 and AS2, and a polyazole resin solution BS1 were prepared. 50 g of ethanol was added to 10 g of BS1 and, after adding 10 g of AS1, 84 g of AS2 was added with stirring. This solution was concentrated until the solid content reached 14% by weight. To the solution, 26 g of ethylene glycol (EG) was added to obtain a polymer electrolyte-containing solution. The solid content was 10.0% by weight, the water content was 61.1% by weight, and the content of EG as a protic solvent other than water was 28.9% by weight.

61 g of the resulting polymer electrolyte-containing solution was uniformly spread over a petri dish made of SUS316 having a width of 20 cm and a length of 20 cm, dried on a hot plate at 80° C. for 2 hours and then subjected to a heat treatment in a hot air oven at 180° C. for one hour.

After cooling, the resulting membrane was peeled off, subjected to acid washing by dipping in an aqueous 2 mol/l HCl solution (manufactured by Wako Pure Chemicals Industries, Ltd.) at 25° C. for 8 hours, sufficiently washed with ion-exchanged water and then dried under an environment of 25° C. and 35% RH.

The membrane thus obtained was a transparent membrane having a uniformly pale brown color, and the thickness was about 50 μm and the conductivity was as high as 0.23 S/cm. The dispersion state of the membrane thus obtained was measured. As a result, the average particle size was 0.18 μm and particles were dispersed very uniformly.

Infrared absorption spectrum analysis revealed chemical bonds (peaks at about 1458 cm$^{-1}$, about 1567 cm$^{-1}$ and about 1634 cm$^{-1}$).

Using this membrane, MEA was made and mounted to a fuel cell single-cell evaluation apparatus, and then a fuel cell characteristic test was conducted using hydrogen gas and air. Similar to Comparative Example 1 described hereinafter, the generated voltage showed a fixed value of 0.64 V immediately after starting and was stable. The fuel cell could be satisfactorily operated for 1000 or more hours and the voltage was 0.60 V after operating for 1000 hours.

Example 13

In the same manner as in Example 1, perfluorocarbonsulfonic acid resin solutions AS1 and AS2, and a polyazole resin solution BS1 were prepared. 25 g of ethanol was added to 5 g of BS1 and, after adding 92 g of AS2, 20.0 g of water was added. This solution was concentrated until the solid content reaches 13% by weight. To the solution, 13 g of n-butyl alcohol (NBA) was added to obtain a polymer electrolyte-containing solution. The solid content was 10.9% by weight, the water content was 73.6% by weight, and the content of NBA as a protic solvent other than water was 15.5% by weight.

61 g of the resulting polymer electrolyte-containing solution was uniformly spread over a petri dish made of SUS316 having a width of 20 cm and a length of 20 cm, dried on a hot plate at 80° C. for 2 hours and then subjected to a heat treatment in a hot air oven at 180° C. for one hour.

After cooling, the resulting membrane was peeled off, subjected to acid washing by dipping in an aqueous 2 mol/l HCl solution (manufactured by Wako Pure Chemicals Industries, Ltd.) at 25° C. for 8 hours, sufficiently washed with ion-exchanged water and then dried under an environment of 25° C. and 35% RH.

The membrane thus obtained was a transparent membrane having a uniformly pale brown color, and the thickness was about 50 μm and the conductivity was as high as 0.23 S/cm. The dispersion state of the membrane thus obtained was measured. As a result, the average particle size was 0.2 μm and particles were dispersed very uniformly.

Infrared absorption spectrum analysis revealed chemical bonds (peaks at about 1458 $cm^{-1}$, about 1567 $cm^{-1}$ and about 1634 $cm^{-1}$).

Using this membrane, MEA was made and mounted to a fuel cell single-cell evaluation apparatus, and then a fuel cell characteristic test was conducted using a hydrogen gas and an air. Similar to Comparative Example 1 described hereinafter, the generated voltage showed a fixed value immediately after starting and was stable. The fuel cell could be satisfactorily operated for 1000 or more hours.

Example 14

A PVDF porous membrane (manufactured by Millipore Corporation, Immobilon-P) was stretched at each stretching ratio of 2 in longitudinal and lateral directions. The thickness of the stretched PVDF membrane was about 120 μm and the porosity determined from the area and weight of the porous membrane was 92%.

To 10 g of a polyazole resin solution BS1, a mixture of 10 g of a perfluorocarbonsulfonic acid resin solution AS1 and 50 g of ethanol (manufactured by Wako Pure Chemicals Industries, Ltd., guaranteed reagent) was added to obtain a pale reddish brown clear solution. The above porous membrane was repeatedly dipped 5 times in a solution prepared by adding 84 g of a concentrated perfluorocarbonsulfonic acid resin solution AS2 to the pale reddish brown clear solution with stirring, finally taken out, dried in a hot air oven at 80° C. for 2 hours in the state of being fixed to a metal frame and then subjected to a heat treatment at 160° C. for one hour. After cooling, the membrane was removed from the metal frame, subjected to acid washing by dipping in an aqueous 2 mol/l HCl solution (manufactured by Wako Pure Chemicals Industries, Ltd.) at 25° C. for 8 hours, sufficiently washed with ion-exchanged water and then dried under an environment of 25° C. and 35% RH.

Consequently, an impregnated membrane having a thickness of about 50 μm was obtained. This impregnated membrane had conductivity of 0.19 S/cm.

A tear strength (g) of this membrane was measured (n=3) using an Elmendorf light-load tearing testing machine (manufactured by Toyo Seiki Seisaku-Sho, Ltd.). A conventional membrane (manufactured by Asahi Kasei Corporation, Aciplex S1002) showed the tear strength of 2.2 g, whereas, the resulting membrane showed a high tear strength of 8.3 g.

Example 15

In the same manner as in Example 1, a perfluorocarbonsulfonic acid resin solution AS1, a concentrated perfluorocarbonsulfonic acid resin solution AS2 and a polyazole resin solution BS1 were prepared. To 10 g of the polyazole resin solution BS1, a mixture of 10 g of the perfluorocarbonsulfonic acid resin solution AS1 and 50 g of ethanol (manufactured by Wako Pure Chemicals Industries, Ltd., guaranteed reagent) was added to obtain a pale reddish brown clear solution. To the solution, 84 g of the concentrated perfluorocarbonsulfonic acid resin solution AS2 was added with stirring. 1 g of POLYFLON Web PTFE fibers (fiber diameter: 10 μm, fiber length: 0.7 to 1 cm) were cut into pieces having an average fiber length of about 500 μm and then sufficiently dispersed in the solution to obtain a polymer electrolyte-containing solution.

54.6 g of the resulting polymer electrolyte-containing solution was uniformly spread over a petri dish made of SUS316 having a width of 20 cm and a length of 20 cm, dried on a hot plate at 80° C. for 2 hours and then subjected to a heat treatment in a hot air oven at 180° C. for one hour.

After cooling, the resulting membrane was peeled off, subjected to acid washing by dipping in an aqueous 2 mol/l HCl solution (manufactured by Wako Pure Chemicals Industries, Ltd.) at 25° C. for 8 hours, sufficiently washed with ion-exchanged water and then dried under an environment of 25° C. and 35% RH.

A tear strength (g) of this membrane was measured (n=3) using an Elmendorf light-load tearing testing machine (manufactured by Toyo Seiki Seisaku-Sho, Ltd.). A conventional membrane (manufactured by Asahi Kasei Corporation, Aciplex S1002) showed the tear strength of 2.2 g, whereas, the resulting membrane showed a high tear strength of 10.1 g.

Example 16

In the same manner as in Example 1, a mixture of 10 g of a perfluorocarbonsulfonic acid resin solution AS1 and 50 g of ethanol (manufactured by Wako Pure Chemicals Industries, Ltd., guaranteed reagent) was added to a polyazole resin solution BS1 to obtain a pale reddish brown clear solution. To the solution, 84 g of a concentrated perfluorocarbonsulfonic acid resin solution AS2 was added with stirring. Consequently, the resulting dispersion solution was a yellow clear solution.

The yellow clear solution was concentrated by heating to 80° C. with stirring. As a result, the water content was 70% by weight, the ethanol content was 19% by weight, and the solid content was 11% by weight.

In this solution, 6 g of a cation-exchange resin (Diaion SK-1B type, manufactured by Mitsubishi Chemical Corporation) was added, followed by slow stirring at room temperature for one hour. Using PP membrane filter having a pore size of 10 μm (manufactured by Millipore Corporation), this solution is suction-filtered to obtain a yellow clean polymer electrolyte-containing solution. The resulting solution had an absorbance of 0.01. The viscosity was 1100 cp.

After charging 20 cc of a polymer electrolyte-containing solution prepared in the same manner into a glass vial bottle whose opening portion has a diameter of 2 cm, an initial falling ball viscosity η0 was measured in the state of being opened. After standing at room temperature for one day in the state of being opened, a falling ball viscosity η1 was measured. η1/η0 was 0.98 and the viscosity was very stable.

36.7 g of the resulting polymer electrolyte-containing solution was uniformly spread over a petri dish made of SUS316 having a width of 20 cm and a length of 20 cm, dried on a hot plate at 80° C. for 2 hours and then subjected to a heat treatment in a hot air oven at 180° C. for one hour.

After cooling, the resulting membrane was peeled off, sufficiently washed with ion-exchanged water and then dried under an environment of 25° C. and 35% RH.

The membrane thus obtained was a transparent membrane having a uniformly pale brown color, and the thickness was about 50 μm and the conductivity was as high as 0.24 S/cm regardless of no acid treatment process. This film was free from cracking and weakening during the heat treatment. The dispersion state of the membrane thus obtained was measured. As a result, the average particle size of PBI was 0.2 μm and particles were dispersed very uniformly.

Infrared absorption spectrum analysis revealed chemical bonds (peaks at about 1458 $cm^{-1}$, about 1567 $cm^{-1}$ and about 1634 $cm^{-1}$).

Using this membrane, MEA was made and mounted to a fuel cell single-cell evaluation apparatus, and then a fuel cell characteristic test was conducted using a hydrogen gas and an air. Similar to Comparative Example 1 described hereinafter, the generated voltage showed a fixed excellent value of 0.65 V immediately after starting and was stable. The fuel cell maintained high generated voltage for 1000 or more hours and the voltage was 0.62 V after operating 1000 hours, and thus the fuel cell could be operated without causing a change with time. Power generation was successively conducted. As a result, the voltage was 0.54 V even after 4000 hours.

Example 17

After charging 20 cc of a polymer electrolyte-containing solution prepared in the same manner as in Example 1 in a glass vial bottle whose opening portion has a diameter of 2 cm, an initial falling ball viscosity η0 was measured in the state of being opened. After standing at room temperature for one day in the state of being opened, a falling ball viscosity η1 was measured. η1/η0 was 1.2 and the viscosity tended to increase.

Comparative Example 1

In the same manner as in Example 1, a solution AS2 (absorbance: 0.04) was prepared and 37.3 g of the solution was uniformly spread over a petri dish made of SUS316 having a width of 20 cm and a length of 20 cm, dried on a hot plate at 80° C. for one hour and then subjected to a heat treatment in a hot air oven at 180° C. for one hour.

After cooling and adding ion-exchanged water in a petri dish, the resulting membrane was peeled and removed, dipped in an aqueous 1 mol/l HCl solution (manufactured by Wako Pure Chemicals Industries, Ltd.) at 25° C. for 8 hours, sufficiently washed with ion-exchanged water and then dried under an environment of 25° C. and 35% RH.

The membrane thus obtained was a uniform transparent membrane, and the thickness was about 50 μm and the conductivity was 0.24 S/cm. The dispersion state of the membrane thus obtained was measured. As a result, no particles were found. Infrared absorption spectrum analysis revealed no chemical bonds (peaks at about 1458 $cm^{-1}$, about 1567 $cm^{-1}$ and about 1634 $cm^{-1}$).

Using this membrane, MEA was made and mounted to a fuel cell single-cell evaluation apparatus, and then a fuel cell characteristic test was conducted using hydrogen gas and air. The generated voltage showed a fixed value of 0.65 V immediately after starting and was stable. The fuel cell could be operated for 400 hours, but the voltage drastically decreased during power generation. Finally, the voltage quickly decreased to 0.25 V or less.

Comparative Example 2

100 g of a perfluorocarbonsulfonic acid resin solution AS1 prepared in the same manner as in Example 1 was vacuum-dried at normal temperature for 24 hours and this solution was added to 45 g of dimethyl-acetamide (DMAC) as an aprotic solvent, followed by mixing for 6 hours (referred to as a solution DS1). Also polybenzimidazole (manufactured by SIGMA-ALDRICH JAPAN Corp., weight average molecular weight: 27000) and DMAC were charged in an autoclave, maintained at 200° C. for 5 hours while being sealed, and then cooled to obtain a solution having a solid content of 10% by weight (solution ES1). To 18 g of the solution DS1, 2 g of the solution ES1 was added, followed by vigorous stirring at 120° C. for 6 hours to obtain a solution. White turbidity was produced in the solution and the solution showed a yellow color and the absorbance was 0.8.

This solution was applied onto a tetrafluoroethylene film in a thickness of about 500 μm using a doctor blade. The coated film was dried at 100° C. for 2 hours, dipped in 1 mol/l sulfuric acid at 100° C. for 2 hours and then dried in an oven at 40° C. The membrane thus obtained had a thickness of about 50 μm and developed white turbidity, and also showed an opaque yellow color. The conductivity was as low as 0.07 S/cm. The dispersion state of the membrane thus obtained was measured. As a result, the average particle size was 4.0 μm.

Using this membrane, MEA was made and mounted to a fuel cell single-cell evaluation apparatus, and then a fuel cell characteristic test was conducted using hydrogen gas and air. Immediately after starting, the generated voltage was as low as about 0.46 V, varied and was unstable. Similarly to Comparative Example 1, the fuel cell could be operated for 600 hours, but a sudden decrease in voltage, which is considered to be caused by $H_2$ gas leak, occurred and the voltage decreased to 0.25 V or less.

Comparative Example 3

20 g of a solution AS2 prepared in Example 1 was added to 200 g of N-methylpyrolidinone (manufactured by SIGMA-ALDRICH JAPAN Corp.), followed by dehydration with heating to 95° C. to obtain a solution FS1 having a solid content of 1% by weight. Polybenzimidazole (manufactured by SIGMA-ALDRICH JAPAN Corp., weight average molecular weight: 27000) and N-methylpyrolidinone were charged in an autoclave, maintained at 200° C. for 5 hours while being sealed, and then cooled to obtain a solution GS1 having a solid content of 10% by weight.

FS1 and GS1 were mixed at a mixing ratio of 40:1. The solution was opaque and showed a yellow color and the absorbance was 0.83. This solution was placed in a SUS petri dish in a thickness of 4100 μm, and then the solvent was distilled off by heating at 120° C. for one hour, then at 140° C. for one hour. After cooling to room temperature and pouring a small amount of ion-exchanged water onto the film, the resulting membrane was peeled and removed from the petri dish. This membrane was heated in 2 mol/l hydrochloric acid at 80° C. for 24 hours and then washed in ion-exchanged water at 20° C. for 24 hours.

The membrane thus obtained had a thickness of about 50 μm and developed white turbidity, and also showed an opaque yellow color. The conductivity was as low as 0.07 S/cm. The dispersion state of the membrane thus obtained was measured. As a result, the average particle size was 2.3 μm.

Using this membrane, MEA was made and mounted to a fuel cell single-cell evaluation apparatus, and then a fuel cell characteristic test was conducted using a hydrogen gas and an air. Immediately after starting, the generated voltage was as low as about 0.45 V, varied and was unstable. The fuel cell could be operated for 500 hours, but sudden decrease in voltage occurred and the voltage decreased to 0.25 V or less.

Comparative Example 4

According to the method described in Comparative Example 3 of Korean Unexamined Patent Publication No. 2003-32321, a 49 μm thick polymer electrolyte membrane comprising perfluorocarbonsulfonic acid resin and PBI (perfluorocarbonsulfonic acid resin/PBI=97.5/2.5 (weight ratio)) was produced in the following manner.

100 g of a perfluorocarbonsulfonic acid resin solution AS3 prepared in the same manner as in Example 3 was vacuum-dried at normal temperature for 24 hours and this solution was added to 45 g of dimethyl-acetamide (DMAC) as an aprotic solvent, followed by mixing for 6 hours (referred to as a solution DS2). Also 10 g of PBI used in Example 3 and 1 g of LiCl were added to 90 g of DMAC, followed by sealing and further stirring under the conditions of a temperature of 120° for 6 hours in an autoclave to obtain a 10 wt % PBI/DMAC solution (ES2). 0.5 g of this solution (ES2) was mixed with 20 g of the perfluorocarbonsulfonic acid resin/DMAC solution, followed by vigorous stirring at 120° C. for 6 hours to obtain a solution. The solution developed white turbidity and showed a yellow color, and the absorbance was 0.6. After standing for 24 hours, slight precipitate was observed.

32 g of this solution was spread over a stainless steel petri dish having a diameter of 15.4 cm, dried in an oven maintained at 100° C. for 2 hours and then subjected to a heat treatment by heating to 150° C. for 6 hours. After being taken out from the oven, cooled and ion-exchanged water being added to the petri dish, the resulting membrane was peeled and removed, dipped in an aqueous 1 mol/l HCl solution (manufactured by Wako Pure Chemicals Industries, Ltd.) at 25° C. for 8 hours, sufficiently washed with ion-exchanged water and then dried under an environment of 25° C. and 35% RH.

The membrane thus obtained developed white turbidity and showed an opaque yellow color, and also had a thickness of about 50 μm and the conductivity was 0.17 S/cm. The dispersion state of the membrane thus obtained was measured. As a result, the average particle size was 2.5 μm.

Using this membrane, MEA was made and mounted to a fuel cell single-cell evaluation apparatus, and then a fuel cell characteristic test was conducted using a hydrogen gas and an air. Similar to Comparative Example 1 described above, the generated voltage showed an excellent value of 0.61 V immediately after starting and was stable. The fuel cell could be operated for a longer time than that in case of Comparative Example 1, for example, 620 hours, but sudden decrease in voltage, which is considered to be caused by an $H_2$ gas leak, occurred and the voltage decreased to 0.25 V or less.

Comparative Example 5

10 g of PBI used in Example 3 and 1 g of LiCl were added to 90 g of DMAC, followed by sealing and further stirring under the conditions of a temperature of 120° for 6 hours in an autoclave to obtain a 10 wt % PBI/DMAC solution (ES3). 0.5 g of this solution ES3 was mixed with 40 g of a perfluorocarbonsulfonic acid resin/DMAC solution AS3 prepared in the same manner as Example 3. During mixing, a precipitate was immediately produced in the solution. The solution in this state was vigorously stirred at 120° C. for 6 hours to obtain a dispersion. The dispersion developed white turbidity and showed a yellow color. When stirring is terminated, a precipitate immediately appeared at the bottom. The absorbance could not be measured stably.

32 g of this solution was spread over a stainless steel petri dish having a diameter of 15.4 cm, dried in an oven maintained at 100° C. for 2 hours and then subjected to a heat treatment by heating to 150° C. for 6 hours. After being taken out from the oven, cooled and ion-exchanged water being added to the petri dish, the resulting membrane was peeled and removed, dipped in an aqueous 1 mol/l HCl solution (manufactured by Wako Pure Chemicals Industries, Ltd.) at 25° C. for 8 hours, sufficiently washed with ion-exchanged water and then dried under an environment of 25° C. and 35% RH.

The membrane thus obtained included a large amount of visually confirmable large-sized (about several tens of μm) precipitates and showed an opaque yellow color, and also had an uneven thickness of about 20 to 70 μm. The ionic conductivity could not be determined because of large unevenness in measurement.

Using this membrane, MEA was made and mounted to a fuel cell single-cell evaluation apparatus, and then a fuel cell characteristic test was conducted using a hydrogen gas and an air. Immediately after starting, the generated voltage was as low as about 0.45 V, varied and was unstable. The fuel cell could be operated for only 330 hours.

TABLE 1

| | Polymer electrolyte-containing solution Absorbance | Solid polymer electrolyte membrane | | | Cell operation | |
|---|---|---|---|---|---|---|
| | | Thickness (μm) | Conductivity (S/cm) | Average particle size (μm) | Voltage behavior upon starting | Duration time (hr) |
| Example 1 | 0.08 | about 50 | 0.23 | 0.20 | stable at predetermined voltage (about 0.65 V) | 1000 or more |
| Example 2 | 0.08 | about 50 | 0.23 | 0.20 | stable at predetermined voltage (about 0.65 V) | 1000 or more |
| Example 3 | 0.08 | about 50 | 0.18 | 0.18 | stable at predetermined voltage (about 0.65 V) | 1000 or more |

TABLE 1-continued

| | Polymer electrolyte-containing solution Absorbance | Solid polymer electrolyte membrane | | | Cell operation | |
|---|---|---|---|---|---|---|
| | | Thickness (μm) | Conductivity (S/cm) | Average particle size (μm) | Voltage behavior upon starting | Duration time (hr) |
| Example 4 | 0.10 | about 50 | 0.23 | 0.30 | stable at predetermined voltage (about 0.65 V) | 1000 or more |
| Example 5 | 0.08 | about 50 | 0.24 | 0.20 | stable at predetermined voltage (about 0.65 V) | 1000 or more |
| Example 6 | 0.09 | about 50 | 0.23 | 0.20 | stable at predetermined voltage (about 0.65 V) | 1000 or more |
| Example 7 | 0.10 | about 50 | 0.18 | 0.30 | stable at predetermined voltage (about 0.65 V) | 1000 or more |
| Example 8 | 0.11 | about 50 | 0.20 | 0.40 | stable at predetermined voltage (about 0.65 V) | 1000 or more |
| Example 9 | 0.12 | about 50 | 0.17 | 0.40 | stable at predetermined voltage (about 0.65 V) | 1000 or more |
| Example 10 | 0.08 | about 50 | 0.23 | 0.20 | stable at predetermined voltage (about 0.65 V) | 1000 or more |
| Example 11 | — | about 50 | 0.22 | 0.15 | stable at predetermined voltage (about 0.65 V) | 1000 or more |
| Example 12 | — | about 50 | 0.23 | 0.18 | stable at predetermined voltage (about 0.65 V) | 1000 or more |
| Example 13 | — | about 50 | 0.23 | 0.20 | stable at predetermined voltage (about 0.65 V) | 1000 or more |
| Example 14 | — | about 50 | 0.19 | — | — | — |
| Example 15 | — | about 50 | — | — | — | — |
| Example 16 | 0.01 | about 50 | 0.24 | 0.20 | stable at predetermined voltage (about 0.65 V) | 1000 or more |
| Comparative Example 1 | 0.04 | about 50 | 0.24 | none | stable at predetermined voltage (0.65 V) | 400 |
| Comparative Example 2 | 0.80 | about 50 | 0.07 | 4.00 | lower than predetermined voltage (0.39 to 0.46 V), unstable | 600 |
| Comparative Example 3 | 0.83 | about 50 | 0.07 | 2.30 | lower than predetermined voltage (0.39 to 0.46 V), unstable | 500 |
| Comparative Example 4 | 0.60 | about 50 | 0.17 | 2.50 | stable at predetermined voltage (0.65 V) | 620 |
| Comparative Example 5 | impossible to measure | 20 to 70 | impossible to measure | Several tens | lower than predetermined voltage (0.33 to 0.52 V), unstable | 330 |

As described above in detail, the polymer electrolyte membrane obtained by the production method of the present invention is particularly effective as a polymer electrolyte membrane for solid polymer electrolyte fuel cell under high temperature and low humidity conditions.

The invention claimed is:

1. A method for producing a solid polymer electrolyte membrane, which comprises:
   a polymer electrolyte-containing solution preparation step, comprising:
      preparing a first solution by dissolving a perfluorocarbonsulfonic acid resin (component A) having an ion-exchange capacity of 0.5 to 3.0 meq/g in a protic solvent;
      preparing a second solution, separate from the first solution, by dissolving a polyazole-based compound (component B) and an alkali metal hydroxide in a protic solvent; and
      mixing the first and second solutions to prepare a polymer electrolyte-containing solution in which a weight ratio of the component A to component B, (A/B), is from 2.3 to 199 and a total weight of the component A and the component B is from 0.5 to 30% by weight on the basis of the solution including the protic solvent, wherein the protic solvent is an aliphatic alcohol; and
   a membrane formation step of forming a membrane from the above polymer electrolyte-containing solution.

2. A method for producing a solid polymer electrolyte membrane according to claim 1, wherein the polymer electrolyte-containing solution preparation step comprises
   adding the solution obtained by dissolving the perfluorocarbonsulfonic acid resin having an ion-exchange capacity of 0.5 to 3.0 meq/g in the protic solvent to the solution obtained by dissolving the polyazole-based compound and the alkali metal hydroxide in the protic solvent.

3. A method for producing a solid polymer electrolyte membrane according to claim 1, wherein the amount of the alkali metal hydroxide is 1 to 100 equivalents per equivalent of nitrogen atoms in the polyazole-based compound.

4. A method for producing a solid polymer electrolyte membrane according to claim 1, wherein, in the polymer electrolyte-containing solution preparation step, the perfluorocarbonsulfonic acid resin having an ion-exchange capacity of 0.5 to 3.0 meq/g, the polyazole-based compound and the alkali metal hydroxide are dissolved in the protic solvent and the resulting solution is subjected to a cation-exchange resin treatment and/or a dialysis treatment using a cation-exchange membrane.

5. A method for producing a solid polymer electrolyte membrane according to claim 1, wherein, in the membrane formation step, a membrane is formed, followed by washing with an acid, washing with water and, if necessary, a heat treatment.

6. A method for producing a solid polymer electrolyte membrane according to claim 1, wherein the perfluorocarbonsulfonic acid resin is a copolymer comprising a repeating unit represented by —$(CF_2$—$CF_2)$— and a repeating unit represented by —$(CF_2$—$CF($—$O$—$(CF_2CFXO)_n$—$(CF_2)_m$—$SO_3H))$— (wherein X represents F or $CF_3$, n represents an integer of 0 to 5, and m represents an integer of 0 to 12, provided that n and m do not simultaneously represent 0).

7. A method for producing a solid polymer electrolyte membrane according to claim 6, wherein n is 0 and m is an integer of 1 to 6 in the repeating unit represented by —$(CF_2$—$CF($—$O$—$(CF_2CFXO)_n$—$(CF_2)_m$—$SO_3H))$—.

8. A method for producing a solid polymer electrolyte membrane according to claim 1, wherein the polyazole-based compound is at least one compound selected from the group consisting of a polyimidazole-based compound, a polybenzimidazole-based compound, a polybenzobisimidazole-based compound, a polybenzoxazole-based compound, a polyoxazole-based compound, a polythiazole-based compound and a polybenzthiazole-based compound.

9. A method for producing a solid polymer electrolyte membrane according to claim 8, wherein the polyazole-based compound is a polybenzimidazole-based compound.

10. A method for producing a solid polymer electrolyte membrane according to claim 1, wherein the protic solvent is mainly composed of a solvent mixture of water and a protic organic solvent having a boiling point which is not higher than that of water.

11. A method for producing a solid polymer electrolyte membrane according to claim 10, wherein the polymer electrolyte-containing solution preparation step comprises once distilling off the protic organic solvent having a boiling point which is not higher than that of water from the resulting polymer electrolyte-containing solution to give a protic solvent mainly composed of water, and adding the protic organic solvent again.

12. A method for producing a solid polymer electrolyte membrane according to claim 1, wherein, in the polymer electrolyte-containing solution preparation step, a reinforcing material is further added to the protic solvent so that the content of the reinforcing material is from 0.01 to 45 vol % based on the total amount of the component A, the component B and the reinforcing material.

13. A method for producing a solid polymer electrolyte membrane according to claim 12, wherein the reinforcing material is a short fibrous substance having an aspect ratio of 5 or more.

14. A method for producing a solid polymer electrolyte membrane according to claim 1, wherein the membrane formation step further comprises impregnating a porous support having a porosity of 40 to 99% made of a reinforcing material with the polymer electrolyte-containing solution.

15. A solid polymer electrolyte membrane obtained by the method according to claim 1.

16. A multi-layer solid polymer electrolyte membrane comprising at least one solid polymer electrolyte membrane according to claim 15.

17. A membrane electrode assembly comprising the membrane according to claim 15.

18. A solid polymer electrolyte fuel cell comprising the membrane electrode assembly according to claim 17.

19. A membrane electrode assembly comprising the membrane according to claim 16.

20. A solid polymer electrolyte fuel cell comprising the membrane electrode assembly according to claim 19.

* * * * *